United States Patent
Kozachenok et al.

(10) Patent No.: US 10,856,520 B1
(45) Date of Patent: Dec. 8, 2020

(54) METHODS FOR GENERATING CONSENSUS FEEDING APPETITE FORECASTS

(71) Applicant: Cryoocyte, Inc., Atlanta, GA (US)

(72) Inventors: Dmitry Kozachenok, Atlanta, GA (US); Allen Torng, Atlanta, GA (US)

(73) Assignee: Ecto, Inc., Atlanta, GA (US)

(*) Notice: Subject to any disclaimer, the term of this patent is extended or adjusted under 35 U.S.C. 154(b) by 0 days.

(21) Appl. No.: 16/740,021

(22) Filed: Jan. 10, 2020

(51) Int. Cl.
| | | |
|---|---|---|
| *A01K 5/00* | (2006.01) | |
| *A01K 5/02* | (2006.01) | |
| *G06Q 10/06* | (2012.01) | |
| *G06N 20/00* | (2019.01) | |
| *A01K 61/80* | (2017.01) | |
| *G06Q 50/02* | (2012.01) | |

(52) U.S. Cl.
CPC .......... *A01K 5/0275* (2013.01); *A01K 5/0291* (2013.01); *A01K 61/80* (2017.01); *G06N 20/00* (2019.01); *G06Q 10/06315* (2013.01); *G06Q 50/02* (2013.01)

(58) Field of Classification Search
CPC .... A01K 5/0275; A01K 61/80; A01K 5/0291; A01K 5/02; A01K 61/85; Y02A 40/845; G06Q 10/06315; G06Q 50/02
See application file for complete search history.

(56) References Cited

U.S. PATENT DOCUMENTS

| | | | | |
|---|---|---|---|---|
| 5,337,698 | A * | 8/1994 | Widmyer | A01K 61/80 119/51.04 |
| 6,510,815 | B1 * | 1/2003 | Lagardere | A01K 61/80 119/230 |
| 8,955,457 | B2 * | 2/2015 | Chen | A01K 61/80 119/230 |
| 2007/0134369 | A1 * | 6/2007 | Mazeris | A01K 11/006 426/2 |
| 2019/0340440 | A1 * | 11/2019 | Atwater | A01K 61/80 |
| 2020/0113158 | A1 * | 4/2020 | Rishi | A01K 61/80 |
| 2020/0196568 | A1 * | 6/2020 | Robertson | A01K 5/0291 |

* cited by examiner

*Primary Examiner* — Trinh T Nguyen

(57) ABSTRACT

Generating consensus feeding appetite forecasts include providing a first feeding parameter data set associated with a first feeding parameter to a first feeding appetite forecast model and providing a second feeding parameter data set associated with a second feeding parameter to a second feeding appetite forecast model different from the first forecast model. The first feeding appetite forecast model is adaptively weighted with a first weighting factor relative to a second weighting factor for the second feeding appetite forecast model. An aggregated appetite score based on a combination of the first feeding appetite forecast model using the first weight factor and the second feeding appetite forecast model using the second weight factor. Further, a feeding instruction signal based at least in part on the aggregated appetite score is provided for modifying the operations of a feed control system.

20 Claims, 8 Drawing Sheets

METHODS FOR GENERATING CONSENSUS FEEDING APPETITE FORECASTS

BACKGROUND

Husbandry, such as in agriculture and aquaculture, includes raising animals for their meat, fiber, milk, eggs, or other products. Animal feed, such as fodder and forage, generally refers to food given to animals. Fodder refers particularly to foods or forages given to animals, rather than that which the animals forage for themselves. Fodder includes grains, silage, compressed and pelleted feeds, oils and mixed rations, and the like. Extensively reared animals may subsist entirely or substantially on forage, but more intensively reared animals will typically require energy and protein-rich foods, such as provided by fodder, in addition to wild forage.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
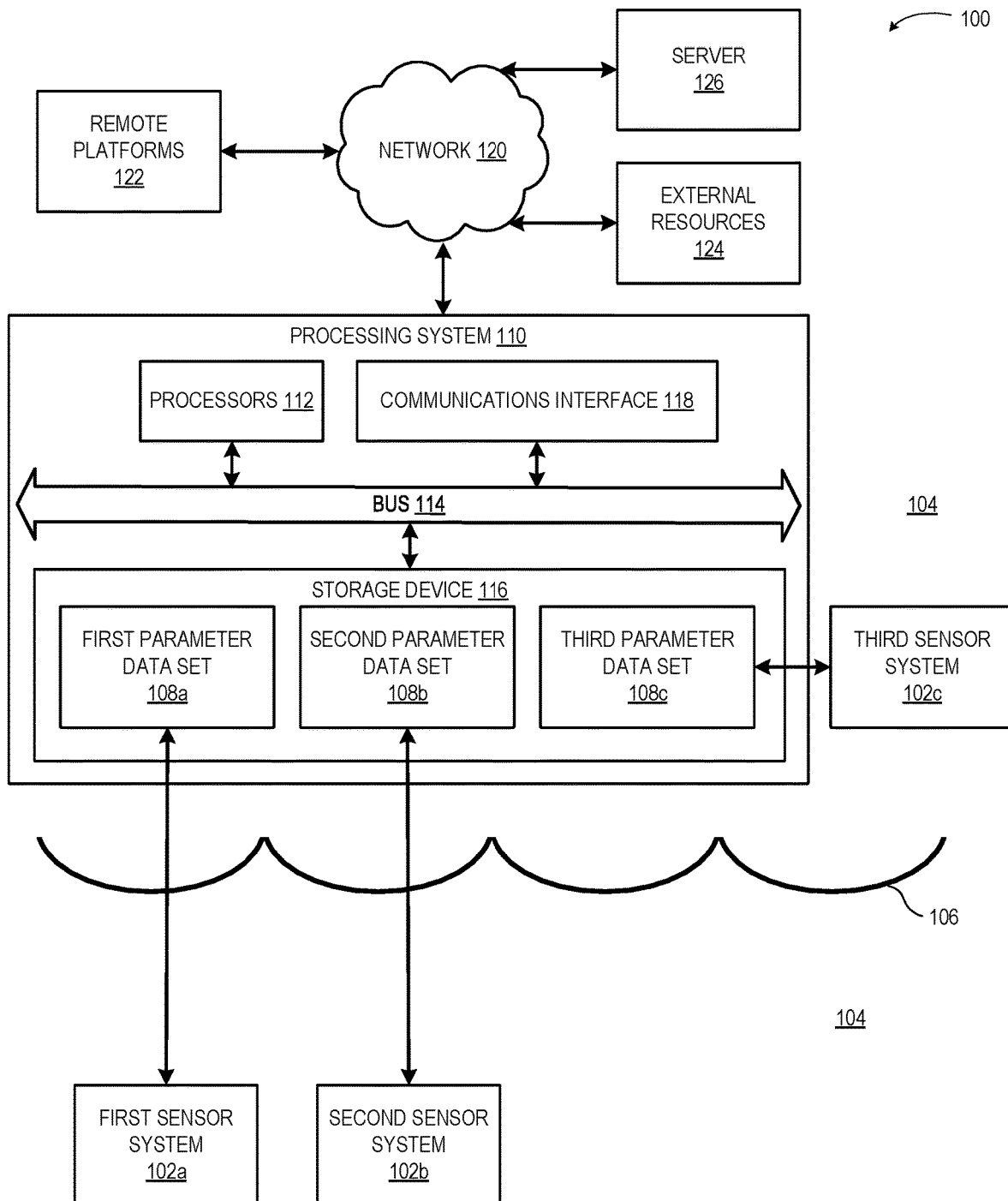
FIG. 1 is a diagram illustrating a system for implementing feeding appetite forecasting in accordance with some embodiments.

In animal husbandry, farmers theoretically aim for the highest growth rate possible, using the least amount of feed to produce the best quality output. Feed conversion ratio (FCR) is a ratio or rate measuring the efficiency with which the bodies of animals convert animal feed into a desired output. With dairy cows, for example, the desired output is milk, whereas in animals raised for meat (e.g., beef cows, pigs, chickens, fish, shrimp, shellfish, and the like) the desired output is flesh/meat. In particular, the feed conversion ratio is the ratio of inputs to outputs (e.g., mass of feed provided per body mass gained by an animal). In some industries, the efficiency of converting feed into the desired output is represented as feed efficiency (FE), which is the output divided by the input (i.e., inverse of FCR).

Typically, aquaculture refers to the cultivation of fish, shellfish, aquatic plants, and the like through husbandry efforts for seafood markets and human consumption. Intensive aquaculture relies on technology to raise fish and shellfish at higher densities. Aqua-culturalists generally attempt to increase control over factors such as water quality, temperature levels, oxygen levels, stocking densities, and feed to promote growth, reduce stress, control disease, and reduce mortality; due to increased control over one or more of such factors, intensive aquaculture generally produces higher yields relative to extensive aquaculture for the same species.

Fish are usually fed a diet of pelleted food, grains, and the like to increase the mass of the resulting farmed fish. Feeding management is one of the more important aspects of aquaculture, as feeding costs contribute 30% or more as a proportion of total production expenses. Feeding management efficiency regarding feeding rate, amount, frequency, and timing should be adjusted to avoid both over- and under-feeding. Underfeeding, in particular, can result in a detrimental effect to the growth of fish due to reduced growth rates. Overfeeding can also result in detrimental effects to the growth of fish due to overload of stomach and intestines which leads to a decrease in digestive efficiency and feed utilization. Further, overfeeding can also result in reduction of profitability due to waste of feed (e.g., particularly with open- or semi-open systems in aquatic environments where uneaten feed does not sit around, as it might with terrestrial farming, but instead gets washed away and therefore wasted), cause deterioration in water quality due to pollution, and/or affect the health of fish by weakening immune systems and increasing susceptibility to infections.

Conventionally, aquaculture companies employ various strategies for increasing feeding management efficiency, such as by hiring additional, experienced employees (which may be difficult to find) and by implementing automated feed distribution technologies. However, feeding times and amounts are often performed based at least in substantial part based on visual determinations made by individual employees, whose performances will be variable amongst different individuals and whose individual performances are also likely variable on a day-to-day basis. Feed distribution systems may be automated to control and monitor feed for individuals or groups of animals, reducing or eliminating the need for extra labor and feeding costs traditionally associated with human performance of feeding tasks. Further, the feed distribution systems may sometimes utilize sensor systems to monitor fish behavior, such as to identify hunger levels and determine behavior during feeding, and to further determine an amount of feed required in order to reach satiation for fish populations.

However, the performance of such automated appetite identification and related sensor systems will have inherent uncertainties in their performance due to the uncertainty of detecting changes in appetite of fish and further by nature of the environments in which they are deployed. For example, aquaculture stock is, with few exceptions, often held underwater and therefore more difficult to observe than animals and plants cultured on land. Further, aquaculture is commonly practiced in open, outdoor environments and therefore exposes farmed animals, farm staff, and farming equipment to factors that are, at least partially, beyond the control of operators. Such factors include, for example, variable and severe weather conditions, changes to water conditions, dissolved oxygen levels, turbidity, interference with farm operations from predators, and the like.

To improve the precision and accuracy of feeding appetite forecasting and decreasing the uncertainties associated with conventional appetite prediction systems, FIGS. 1-8 describe techniques for providing a feeding appetite forecast that includes providing a first feeding parameter data set associated with a first feeding parameter to a first feeding appetite forecast model. A second feeding parameter data set associated with a second feeding parameter is provided to a second feeding appetite forecast model different from the first forecast model. Subsequently, the first feeding appetite forecast model is adaptively weighted with a first weighting factor relative to a second weighting factor for the second feeding appetite forecast model. An aggregated appetite score is determined based on a combination of the first feeding appetite forecast model using the first weight factor and the second feeding appetite forecast model using the second weight factor. In this manner, different feeding appetite predictions from different feeding appetite forecast models are adaptively weighted and combined into an aggregated appetite score that is more accurate than would be individually provided by each feeding appetite forecast model by itself.

FIG. 1 is a diagram of a system 100 for implementing feeding appetite forecasting in accordance with some embodiments. In various embodiments, the system 100 includes a plurality of sensor systems 102 that are each configured to monitor and generate data associated with the environment 104 within which they are placed. As shown, the plurality of sensor systems 102 includes a first sensor system 102a positioned below the water surface 106 and including a first set of one or more sensors. The first set of one or more sensors are configured to monitor the environment 104 below the water surface 106 and generate data associated with a first feeding parameter. It will be appreciated that feeding parameters, in various embodiments, include one or more parameters corresponding to the environment 104 within which the one or more sensors are positioned and may be measured (or otherwise captured and detected) to generate parameter data sets 108 to be used in forecasting models. Accordingly, in some embodiments, the first sensor system 102a generates a first parameter data set 108a and communicates the first parameter data set 108a to a processing system 110 for storage, processing, and the like.

The plurality of sensor systems 102 also includes a second sensor system 102b positioned below the water surface 106 and including a second set of one or more sensors. The second set of one or more sensors are configured to monitor the environment 104 below the water surface 106 and generate data associated with a second feeding parameter. It will be appreciated that feeding parameters, in various embodiments, include one or more parameters corresponding to the environment 104 within which the one or more sensors are positioned and may be measured (or otherwise captured and detected) to generate parameter data sets 108 to be used in forecasting models. Accordingly, in some embodiments, the second sensor system 102b generates a second parameter data set 108b and communicates the second parameter data set 108b to the processing system 110 for storage, processing, and the like. It should be recognized that the plurality of sensor systems 102 are not limited to being positioned under the water surface 106. In some embodiments, the plurality of sensor systems 102 also includes a third sensor system 102c positioned at or above the water surface 106 and including a third set of one or more sensors. The third set of one or more sensors are configured to monitor the environment 104 at or above the water surface 106 and generate data associated with a third feeding parameter. Accordingly, in some embodiments, the third sensor system 102c generates a third parameter data set 108c and communicates the third parameter data set 108c to the processing system 110 for storage, processing, and the like.

The processing system 110 includes one or more processors 112 coupled with a communications bus 114 for processing information. In various embodiments, the one or more processors 112 include, for example, one or more general purpose microprocessors or other hardware processors. The processing system 110 also includes one or more storage devices 116 communicably coupled to the communications bus 114 for storing information and instructions. For example, in some embodiments, the one or more storage devices 116 includes a magnetic disk, optical disk, or USB thumb drive, and the like for storing information and instructions. In various embodiments, the one or more storage devices 116 also includes a main memory, such as a random-access memory (RAM), cache and/or other dynamic storage devices, coupled to the communications bus 114 for storing information and instructions to be executed by the one or more processors 112. The main memory may be used for storing temporary variables or other intermediate information during execution of instructions to be executed by the one or more processors 112. Such instructions, when stored in storage media accessible by the one or more processors 112, render the processing system 110 into a special-purpose machine that is customized to perform the operations specified in the instructions. By way of non-limiting example, in various embodiments, the processing system 110 may be any computer system, such as a workstation, desktop computer, server, laptop, handheld computer, tablet computer, mobile computing or communication device, or other form of computing or telecommunications device that is capable of communication and that has sufficient processor power and memory capacity to perform the operations described herein.

The processing system 110 also includes a communications interface 118 communicably coupled to the communications bus 114. The communications interface 118 provides a multi-way data communication coupling configured to send and receive electrical, electromagnetic or optical signals that carry digital data streams representing various types of information. In various embodiments, the communications interface 118 provides data communication to other data devices via, for example, a network 120. For example, in some embodiments, the processing system 110 may be configured to communicate with one or more remote platforms 122 according to a client/server architecture, a peer-to-peer architecture, and/or other architectures via a network 116. Remote platform(s) 122 may be configured to communicate with other remote platforms via the processing system 110 and/or according to a client/server architecture, a peer-to-peer architecture, and/or other architectures via the network 116. Users may access system 100 via remote platform(s) 122.

A given remote platform 122 may include one or more processors configured to execute computer program modules. The computer program modules may be configured to enable a user associated with the given remote platform 122 to interface with system 100 and/or external resources 124, and/or provide other functionality attributed herein to remote platform(s) 122. External resources 122 may include sources of information outside of system 100, external entities participating with system 100, and/or other resources. In some implementations, some or all of the functionality attributed herein to external resources 122 may be provided by resources included in system 100.

In some embodiments, the processing system 110, remote platform(s) 122, and/or one or more external resources 124 may be operatively linked via one or more electronic communication links. For example, such electronic communication links may be established, at least in part, via the network 120. It will be appreciated that this is not intended to be limiting, and that the scope of this disclosure includes implementations in which computing platform(s) 102, remote platform(s) 104, and/or external resources 122 may be operatively linked via some other communication media. Further, in various embodiments, the processing system 110 is configured to send messages and receive data, including program code, through the network 120, a network link (not shown), and the communications interface 118. For example, a server 126 may be configured to transmit or receive a requested code for an application program through via the network 120, with the received code being executed by the one or more processors 112 as it is received, and/or stored in storage device 116 (or other non-volatile storage) for later execution.

In various embodiments, the processing system 110 receives one or more of the parameter data sets 108 and stores the parameter data sets 108 at the storage device 116 for processing. As described in more detail below with respect to FIGS. 2-8, the processing system 110 provides a first feeding parameter data set (e.g., first parameter data set 108a) to a first feeding appetite forecast model and further provides a second feeding parameter data set (e.g., second parameter data set 108b) to a second feeding appetite forecast model different from the first forecast model. In various embodiments, the first feeding appetite forecast model receives a data set corresponding to measurements for at least a first feeding parameter related to feeding appetite forecasting. Similarly, the second feeding appetite forecast model receives a data set corresponding to measurements for at least a second feeding parameter related to feeding appetite forecasting. By way of non-limiting example, in some embodiments, a feeding parameter describes fish position within the water below the water surface 106.

Data corresponding to such a feeding parameter may be utilized as input by a feeding appetite forecast model to generate a description of a possible hunger level to be exhibited by the fish within the water for a future time period (i.e., a feeding appetite prediction). Subsequently, the processing system 110 adaptively weights the first feeding appetite forecast model with a first weighting factor relative to a second weighting factor for the second feeding appetite forecast model in order to determine an aggregated appetite score based on a combination of the first feeding appetite forecast model using the first weight factor and the second feeding appetite forecast model using the second weight factor. In this manner, the processing system 110 provides a weighting to different feeding appetite predictions from different feeding appetite forecast models and combines them into an aggregated appetite score that is more accurate than would be individually provided by each feeding appetite forecast model by itself.

As described in more detail below with respect to FIGS. 2-8, by assigning weight factors to the feeding appetite forecast models and their respective feeding appetite forecasts, the system influences the forecast parameters utilized and therefore combine the forecast parameters in an advantageous way. The resulting aggregated appetite score therefore indicates for multiple forecast parameters and forecast models and may have an improved prediction accuracy. For example, using multiple forecasts from multiple sources and combining them in an optimal way based on a validation and comparison of model parameters with reference data (e.g., weather data, weather forecasts, environmental conditions, and more as discussed in further detail below) provides an appetite forecast with an increased accuracy.

In various embodiments, the system 100 also includes a feed control system (not shown) that receives a feed instruction signal (such as feeding instruction signals 310 and 810 described in more detail below with respect to FIGS. 3 and 8) for modifying and/or guiding the operations (e.g., dispensing of feed related to meal size, feed distribution, meal frequency, feed rate, etc.) of feeding systems including automatic feeders, feed cannons, and the like. It should be recognized that the feed instruction signal is not limited to any particular format and may include any representation including but not limited to feeding instructions, user interface alerts, and the like. As will be appreciated, in various embodiments, users and operators may be capable of modifying their feeding strategy manually based on the feed instruction signal. For example, in some embodiments, the operator may provide fewer feed pellets when the feed instruction signal provides a signal that appetite is low, such as via graphical user interface (GUI) displays, audible and visual alerts, and the like. In other embodiments, the feed instruction signal may be provided to an automatic feeder for controlling feeding operations in a manner that reduces or eliminates manual, human intervention. Accordingly, various parameters such as feeding rate, feeding amount, feeding frequency, feeding timing, and the like may be modified based on the feeding instruction signal.

Figure 2:
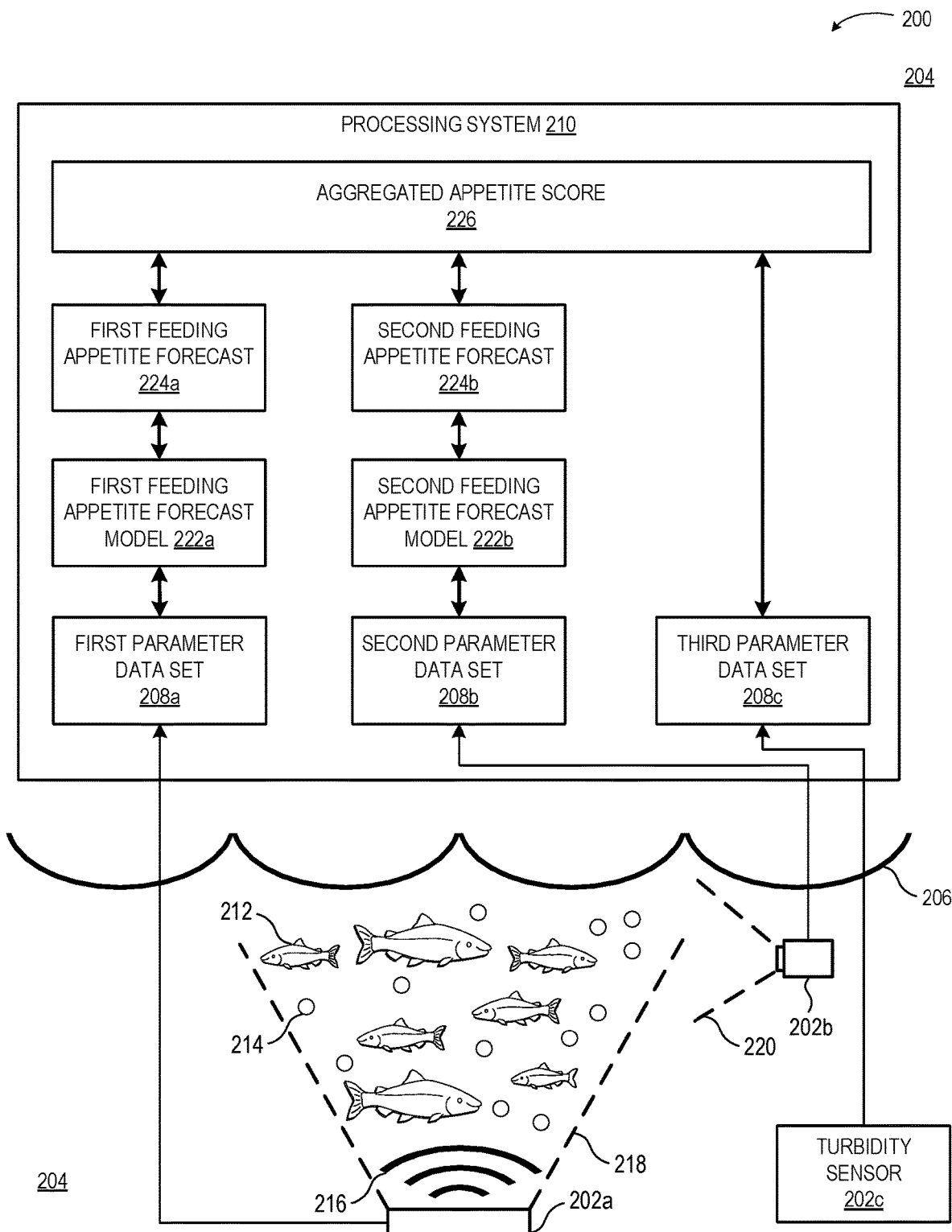
FIG. 2 is a diagram illustrating a forecast system implementing two sets of different underwater sensors in accordance with some embodiments.

Referring now to FIG. 2, illustrated is a diagram showing a system 200 implementing two sets of different underwater sensors in accordance with some embodiments. In various embodiments, the system 200 includes a plurality of sensor systems 202 that are each configured to monitor and generate data associated with the environment 204 within which they are placed. As shown, the plurality of sensor systems 202 includes a first sensor system 202a positioned below the water surface 206 and including a first set of one or more sensors. The first set of one or more sensors are configured to monitor the environment 204 below the water surface 206 and generate data associated with a first feeding parameter. In particular, the first sensor system 202a of FIG. 2 includes one or more hydroacoustic sensors configured to observe fish behavior and capture measurements associated with feeding parameters related to fish appetite. For example, in various embodiments, the hydroacoustic sensors are configured to capture acoustic data corresponding to the presence (or absence), abundance, distribution, size, and behavior of underwater objects (e.g., a population of fish 212 as illustrated in FIG. 2).

Such acoustic data measurements may therefore measure fish positions within the water to be used as an approximation of appetite. As used herein, it should be appreciated that an "object" refers to any stationary, semi-stationary, or moving object, item, area, or environment in which it may be desired for the various sensor systems described herein to acquire or otherwise capture data of. For example, an object may include, but is not limited to, one or more fish, crustacean, feed pellets, predatory animals, and the like. However, it should be appreciated that the sensor measurement acquisition and analysis systems disclosed herein may acquire and/or analyze sensor data regarding any desired or suitable "object" in accordance with operations of the systems as disclosed herein.

The one or more hydroacoustic sensors of the first sensor system 202a includes one or more of a passive acoustic sensor and/or an active acoustic sensor (e.g., an echo sounder and the like). Passive acoustic sensors generally listen for remotely generated sounds (e.g., often at specified frequencies or for purposes of specific analyses, such as for detecting fish or feed in various aquatic environments) without transmitting into the underwater environment 204. In contrast, active acoustic sensors conventionally include both an acoustic receiver and an acoustic transmitter that transmit pulses of sound (e.g., pings) into the surrounding environment 204 and then listens for reflections (e.g., echoes) of the sound pulses. It is noted that as sound waves/pulses travel through water, it will encounter objects having differing densities or acoustic properties than the surrounding medium (i.e., the underwater environment 204) that reflect sound back towards the active sound source(s) utilized in active acoustic systems. For example, sound travels differently through fish 212 (and other objects in the water such as feed pellets 214) than through water (e.g., a fish's air-filled swim bladder has a different density than water). Accordingly, differences in reflected sound waves from active acoustic techniques due to differing object densities may be accounted for in the detection of aquatic life and estimation of their individual sizes or total biomass. It should be recognized that although specific sensors are described below for illustrative purposes, various hydroacoustic sensors may be implemented in the systems described herein without departing from the scope of this disclosure.

In various embodiments, the first sensor system 202a utilizes active sonar systems in which pulses of sound are generated using a sonar projector including a signal generator, electro-acoustic transducer or array, and the like. The active sonar system may further include a beamformer (not shown) to concentrate the sound pulses into an acoustic beam 216 covering a certain search angle 218. In some embodiments, the first sensor system 202a measures distance through water between two sonar transducers or a combination of a hydrophone (e.g., underwater acoustic microphone) and projector (e.g., underwater acoustic speaker). The first sensor system 202a includes sonar transducers (not shown) for transmitting and receiving acoustic signals (e.g., pings). To measure distance, one transducer (or projector) transmits an interrogation signal and measures the time between this transmission and the receipt of a reply signal from the other transducer (or hydrophone). The time difference, scaled by the speed of sound through water and divided by two, is the distance between the two platforms. This technique, when used with multiple transducers, hydrophones, and/or projectors calculates the relative positions of objects in the underwater environment 204.

In other embodiments, the first sensor system 202a includes an acoustic transducer configured to emit sound pulses into the surrounding water medium. Upon encountering objects that are of differing densities than the surrounding water medium (e.g., the fish 212), those objects reflect back a portion of the sound towards the sound source (i.e., the acoustic transducer). Due to acoustic beam patterns, identical targets at different azimuth angles will return different echo levels. Accordingly, if the beam pattern and angle to a target is known, this directivity may be compensated for. In various embodiments, split-beam echosounders divide transducer faces into multiple quadrants and allow for location of targets in three dimensions. Similarly, multibeam sonar projects a fan-shaped set of sound beams outward from the first sensor system 202a and record echoes in each beam, thereby adding extra dimensions relative to the narrower water column profile given by an echosounder. Multiple pings may thus be combined to give a three-dimensional representation of object distribution within the water environment 204.

In some embodiments, the one or more hydroacoustic sensors of the first sensor system 202a includes a Doppler system using a combination of cameras and utilizing the Doppler effect to monitor the appetite of salmon in sea pens. The Doppler system is located underwater and incorporates a camera, which is positioned facing upwards towards the water surface 206. In various embodiments, there is a further camera integrated in the transmission device normally positioned on the top-right of the pen, monitoring the surface of the pen. The sensor itself uses the Doppler effect to differentiate pellets from fish. The sensor produces an acoustic signal and receives the echo. The sensor is tuned to recognize pellets and is capable of transmitting the information by radio link to the feed controller over extended distances. The user watches the monitor and determines when feeding should be stopped. Alternatively, a threshold level of waste pellets can be set by the operator, and the feeder will automatically switch off after the threshold level is exceeded.

In other embodiments, the one or more hydroacoustic sensors of the first sensor system 202a includes an acoustic camera having a microphone array (or similar transducer array) from which acoustic signals are simultaneously collected (or collected with known relative time delays to be able to use phase different between signals at the different microphones or transducers) and processed to form a representation of the location of the sound sources. In various embodiments, the acoustic camera also optionally includes an optical camera.

Additionally, as illustrated in FIG. 2, the plurality of sensor systems 202 includes a second sensor system 202b positioned below the water surface 206 and including a second set of one or more sensors. The second set of one or more sensors are configured to monitor the environment 204 below the water surface 206 and generate data associated with a second feeding parameter. In particular, the second sensor system 202b of FIG. 2 includes one or more imaging sensors configured to observe fish behavior and capture measurements associated with feeding parameters related to fish appetite. In various embodiments, the imaging sensors are configured to capture image data corresponding to, for example, the presence (or absence), abundance, distribution, size, and behavior of underwater objects (e.g., a population of fish 212 as illustrated in FIG. 2). Such image data measurements may therefore be used to identify fish positions within the water for approximation of appetite. It should be recognized that although specific sensors are described below for illustrative purposes, various imaging sensors may be implemented in the systems described herein without departing from the scope of this disclosure.

In some embodiments, the imaging sensors of the second sensor system 202b includes one or more cameras configured to capture still images and/or record moving images (e.g., video data). The one or more cameras are directed towards the surrounding environment 204 below the water surface 206, with each camera capturing a sequence of images (e.g., video frames) of the environment 204 and any objects in the environment. In various embodiments, each camera has a different viewpoint or pose (i.e., location and orientation) with respect to the environment. Although FIG. 2 only shows a single camera for ease of illustration and description, persons of ordinary skill in the art having benefit of the present disclosure should appreciate that the second sensor system 202b can include any number of cameras and which may account for parameters such as each camera's horizontal field of view, vertical field of view, and the like. Further, persons of ordinary skill in the art having benefit of the present disclosure should appreciate that the second sensor system 202b can include any arrangement of cameras (e.g., cameras positioned on different planes relative to each other, single-plane arrangements, spherical configurations, and the like).

In various embodiments, the imaging sensors of the second sensor system 202b includes a first camera (or lens) having a particular field of view 220 as represented by the dashed lines that define the outer edges of the camera's field of view that images the environment 204 or at least a portion thereof. For the sake of clarity, only the field of view 220 for a single camera is illustrated in FIG. 2. In various embodiments, the imaging sensors of the second sensor system 202b includes at least a second camera having a different but overlapping field of view (not shown) relative to the first camera (or lens). Images from the two cameras therefore form a stereoscopic pair for providing a stereoscopic view of objects in the overlapping field of view. Further, it should be recognized that the overlapping field of view is not restricted to being shared between only two cameras. For example, at least a portion of the field of view 220 of the first camera of the second sensor system 202b may, in some embodiments, overlap with the fields of view of two other cameras to form an overlapping field of view with three different perspectives of the environment 204.

In some embodiments, the imaging sensors of the second sensor system 202b includes one or more light field cameras configured to capture light field data emanating from the surrounding environment 204. In other words, the one or more light field cameras captures data not only with respect to the intensity of light in a scene (e.g., the light field camera's field of view/perspective of the environment) but also the directions of light rays traveling in space. In contrast, conventional cameras generally record only light intensity data. In other embodiments, the imaging sensors of the second sensor system 202b includes one or more range imaging cameras (e.g., time-of-flight and LIDAR cameras) configured to determine distances between the camera and the subject for each pixel of captured images. For example, such range imaging cameras may include an illumination unit (e.g., some artificial light source) to illuminate the scene and an image sensor with each pixel measuring the amount of time light has taken to travel from the illumination unit to objects in the scene and then back to the image sensor of the range imaging camera.

It should be noted that the various operations are described here in the context of multi-camera or multi-lens cameras. However, it should be recognized that the operations described herein may similarly be implemented with any type of imaging sensor without departing from the scope of this disclosure. For example, in various embodiments, the imaging sensors of the second sensor system 202 may include, but are not limited to, any of a number of types of optical cameras (e.g., RGB and infrared), thermal cameras, range- and distance-finding cameras (e.g., based on acoustics, laser, radar, and the like), stereo cameras, structured light cameras, ToF cameras, CCD-based cameras, CMOS-based cameras, machine vision systems, light curtains, multi- and hyper-spectral cameras, thermal cameras, and the like.

Additionally, as illustrated in FIG. 2, the plurality of sensor systems 202 includes a third sensor system 202c positioned below the water surface 206 and including a third set of one or more sensors. The third set of one or more sensors are configured to monitor the environment 204 below the water surface 206 and generate data associated with a reference parameter. In particular, the third sensor system 202c of FIG. 2 includes one or more environmental sensors configured to capture measurements associated with the environment 204 within which the system 200 is deployed. As described in further detail below, in various embodiments, the environmental sensors of the third sensor system 202c generate environmental data that serves as reference data for implementing the dynamic weighting of various forecasts from a plurality of feeding appetite forecast models. For example, in one embodiment, the environmental sensors of the third sensor system 202c includes a turbidity sensor configured to measure an amount of light scattered by suspended solids in the water. Turbidity is a measure of the degree to which water (or other liquids) changes in level of its transparency due to the presence of suspended particulates (e.g., by measuring an amount of light transmitted through the water).

In general, the more total suspended particulates or solids in water, the higher the turbidity and therefore murkier the water appears. As will be appreciated, a variable parameter such as variance in the turbidity of a liquid medium will affect the accuracy of image-based measurements and accordingly the accuracy of prediction models that consume such images as input. Accordingly, by measuring turbidity as a reference parameter, the detected intensity of turbidity measurements may be utilized as a basis for determining a weighting that an image-based prediction model should be given relative to other non-image based prediction models, as described in more detail below. It should be recognized that although FIG. 2 is described in the specific context of a turbidity sensor, the third sensor system 202c may include any number of and any combination of various environmental sensors without departing from the scope of this disclosure.

The first sensor system 202a and the second sensor system 202b each generate a first feeding parameter data set 208a and a second feeding parameter data set 208b, respectively. In the context of FIG. 2, the first feeding parameter includes acoustic data. Such acoustic data may include any acoustics-related value or other measurable factor/characteristic that is representative of at least a portion of a data set that describes the presence (or absence), abundance, distribution, size, and/or behavior of underwater objects (e.g., a population of fish 212 as illustrated in FIG. 2). For example, the acoustic data may include acoustic measurements indicative of the relative and/or absolute locations of individual fish of the population of fish 212 within the environment 204. It should be recognized that although the first feeding parameter has been abstracted and described here generally as "acoustic data" for ease of description, those skilled in the art will understand that acoustic data (and therefore the first feeding parameter data set 208a corresponding to the acoustic data) may include, but is not limited to, any of a plurality of acoustics measurements, acoustic sensor specifications, operational parameters of acoustic sensors, and the like.

In the context of FIG. 2, the second feeding parameter includes image data. Such image data may include any image-related value or other measurable factor/characteristic that is representative of at least a portion of a data set that describes the presence (or absence), abundance, distribution, size, and/or behavior of underwater objects (e.g., a population of fish 212 as illustrated in FIG. 2). For example, the image data may include camera images capturing measurements representative of the relative and/or absolute locations of individual fish of the population of fish 212 within the environment 204. It should be recognized that although the second feeding parameter has been abstracted and described here generally as "image data" for ease of description, those skilled in the art will understand that image data (and therefore the second feeding parameter data set 208b corresponding to the image data) may include, but is not limited to, any of a plurality of image frames, extrinsic parameters defining the location and orientation of the image sensors, intrinsic parameters that allow a mapping between camera coordinates and pixel coordinates in an image frame, camera models, operational parameters of the image sensors (e.g., shutter speed), depth maps, and the like.

Similarly, in the context of FIG. 2, the reference parameter includes environmental data. Such environmental data may include any measurement representative of the environment 204 within which the environmental sensors are deployed. For example, the environmental data (and therefore the reference parameter data set 208c corresponding to the environmental data) may include, but is not limited to, any of a plurality of water turbidity measurements, water temperature measurements, metocean measurements, weather forecasts, air temperature, dissolved oxygen, current direction, current speeds, and the like.

In various embodiments, the processing system 210 receives one or more of the data sets 208 (e.g., first feeding parameter data set 208a, the second feeding parameter data set 208b, and the reference parameter data set 208c) via, for example, wired-telemetry, wireless-telemetry, or any other communications links for processing. The processing system 210 provides the first feeding parameter data set 208a to a first feeding appetite forecast model 222a. The processing system 210 also provides the second feeding parameter data set 208b to a second feeding appetite forecast model 222b different from the first feeding appetite forecast model 222a. In various embodiments, the first feeding appetite forecast model 222a receives the acoustic data of the first feeding parameter data set 208a as input and generates a first feeding appetite forecast 224a.

By way of non-limiting example, in some embodiments, the first feeding appetite forecast model 222a utilizes acoustic data related to fish position within the water below the water surface 206 as a proxy for appetite (as appetite is a value which cannot be directly measured and must be inferred) in generating the first feeding appetite forecast 224a. In various embodiments, the first feeding appetite forecast 224a is a description of a possible hunger level to be exhibited by the population of fish 212 within the water for a future time period (i.e., a feeding appetite prediction).

In various embodiments, such as described below in more detail with respect to FIG. 3, the first feeding appetite forecast 224a generated by the first feeding appetite forecast model 222a is represented as a numerical score within a numerical indexing system. However, those skilled in the art will recognize that such a numerical representation of appetite and appetite prediction is provided as a non-limiting example for ease of illustration. As used herein, the term "feeding appetite forecast" refers to any representation (e.g., including both quantitative and qualitative) or other description of a parameter (which may be based on sensor measurements, derived from sensor measurements, input based on human observations, and the like).

Figure 8:
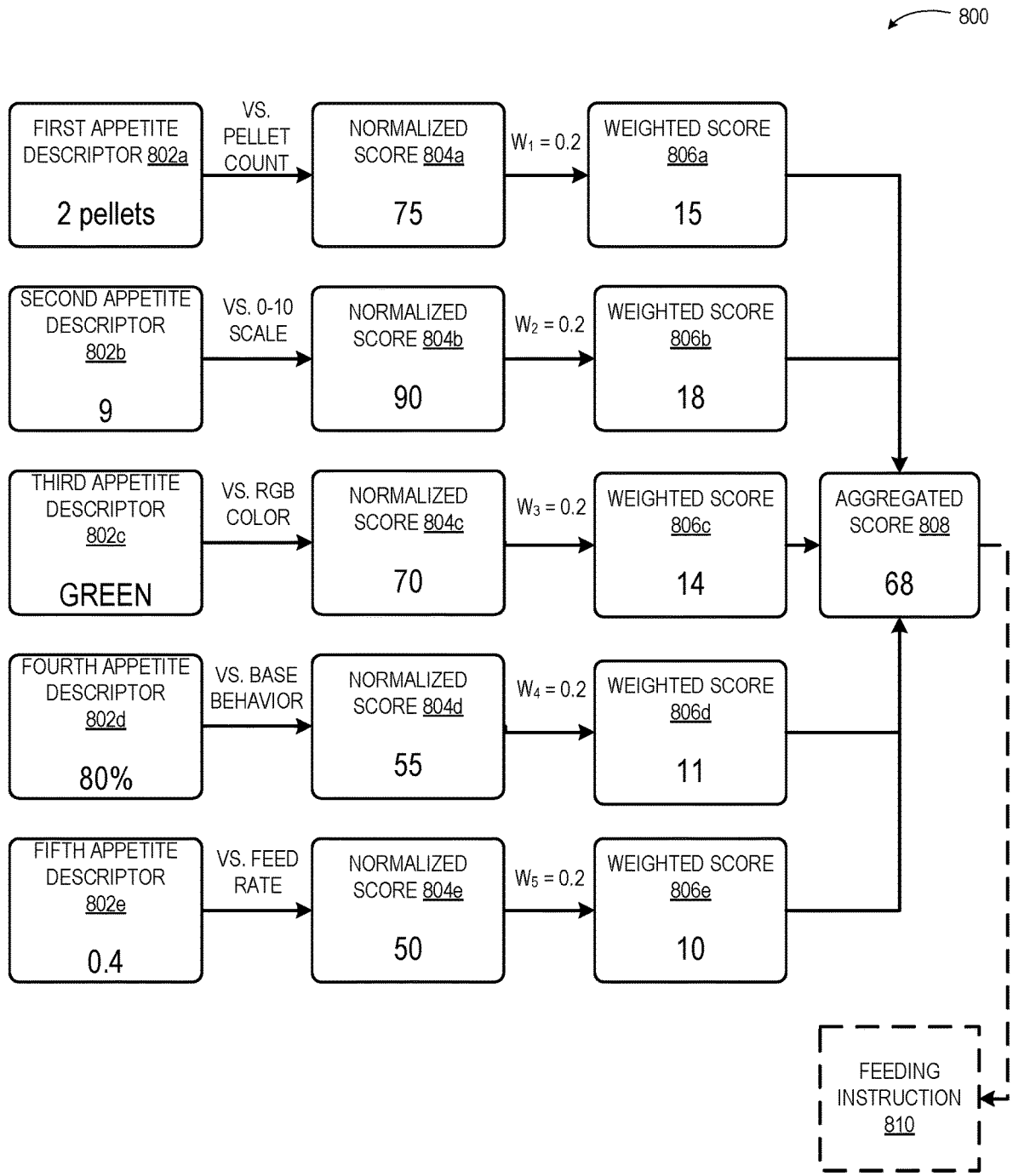
FIG. 8 is a block diagram illustrating a second example adaptive weighting of feeding appetite forecasts in accordance with some embodiments

Additionally, it should be recognized that a "feeding appetite forecast" is not limited to the output of forecast models and in some embodiments may include, for example, human-based inputs such as textual entries in a spreadsheet indicating hunger status (e.g., hungry vs. not hungry), numerical descriptors of fish activity (e.g., appetite ranking on a 0-10 scale based on feeder personal experience such as feeding appetite forecast 802b of FIG. 8), and the like. In other embodiments, such as described below in more detail with respect to FIG. 8, a "feeding appetite forecast" may also include (model-based-output or otherwise) a raw numerical quantification without any relation to a baseline reference (e.g., feeding appetite forecast 802a), a color-coded descriptor (e.g., feeding appetite forecast 802c), a percentage quantification of total biomass positioned at a location within the water that is indicative of hunger (e.g., biomass within an upper ⅓ of sea cage volume, such as feeding appetite forecast 802d), instructions to change feeding rate or total amount (e.g., feeding appetite forecast 802e) and the like.

Further, it should be noted that although the various operations are primarily described here in the context of forecasting (or predicting) appetite for a future time period, the operations described herein may similarly be applied to description for a prior time period or description of a feeding appetite metric in real-time (i.e., for a current time period) without departing from the scope of this disclosure. Accordingly, as used herein, a "forecast" or "prediction" (e.g., in the context of feeding) refers to describing, either qualitatively or quantitatively, any proxy related to estimated level of appetite (or in the inverse, satiation), as appetite levels are generally not directly quantifiable or otherwise measurable in discrete unit terms (unlike, for example, temperature or humidity which have conventional units of measurement).

The processing system 210 also provides the second feeding parameter data set 208b to a second feeding appetite forecast model 222b. In various embodiments, the second feeding appetite forecast model 222b receives the image data of the second feeding parameter data set 208b as input and generates a second feeding appetite forecast 224b. By way of non-limiting example, in some embodiments, the second feeding appetite forecast model 222b utilizes image data related to fish position within the water below the water surface 206 as an appetite proxy for generating the second feeding appetite forecast 224b. In various embodiments, the second feeding appetite forecast 224a is a description of a possible hunger level to be exhibited by the population of fish 212 within the water for a future time period (i.e., a feeding appetite prediction).

Subsequently, the processing system 210 adaptively weights the first feeding appetite forecast 224a of the first feeding appetite forecast model 222a with a first weighting factor relative to a second weighting factor for a second feeding appetite forecast 224b of the second feeding appetite forecast model 222b in order to determine an aggregated appetite score 226 based on a combination of the first feeding appetite forecast model 222a using the first weight factor and the second feeding appetite forecast model 222b using the second weight factor. In this manner, and as described in more detail below, the processing system 210 provides a weighting to different feeding appetite predictions from different feeding appetite forecast models and combines them into an aggregated appetite score 226 that is more accurate than would be individually provided by each feeding appetite forecast model by itself.

Figure 3:
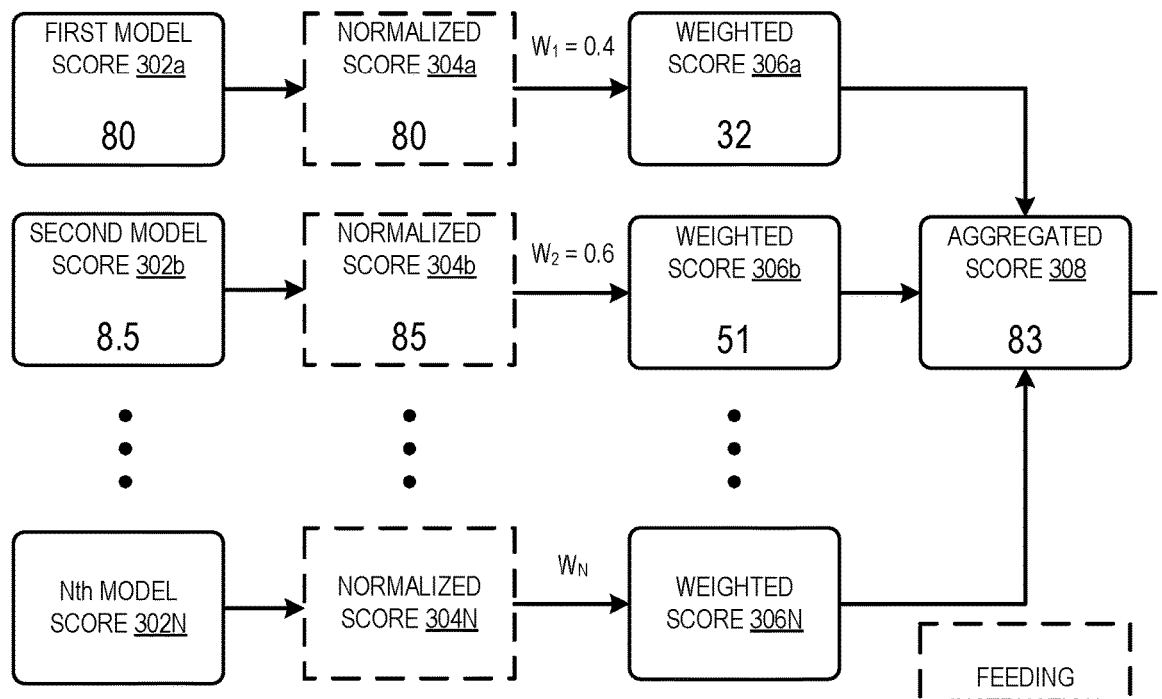
FIG. 3 is a diagram illustrating a first example of adaptive weighting of feeding appetite forecast models in accordance with some embodiments.
Figure 3:
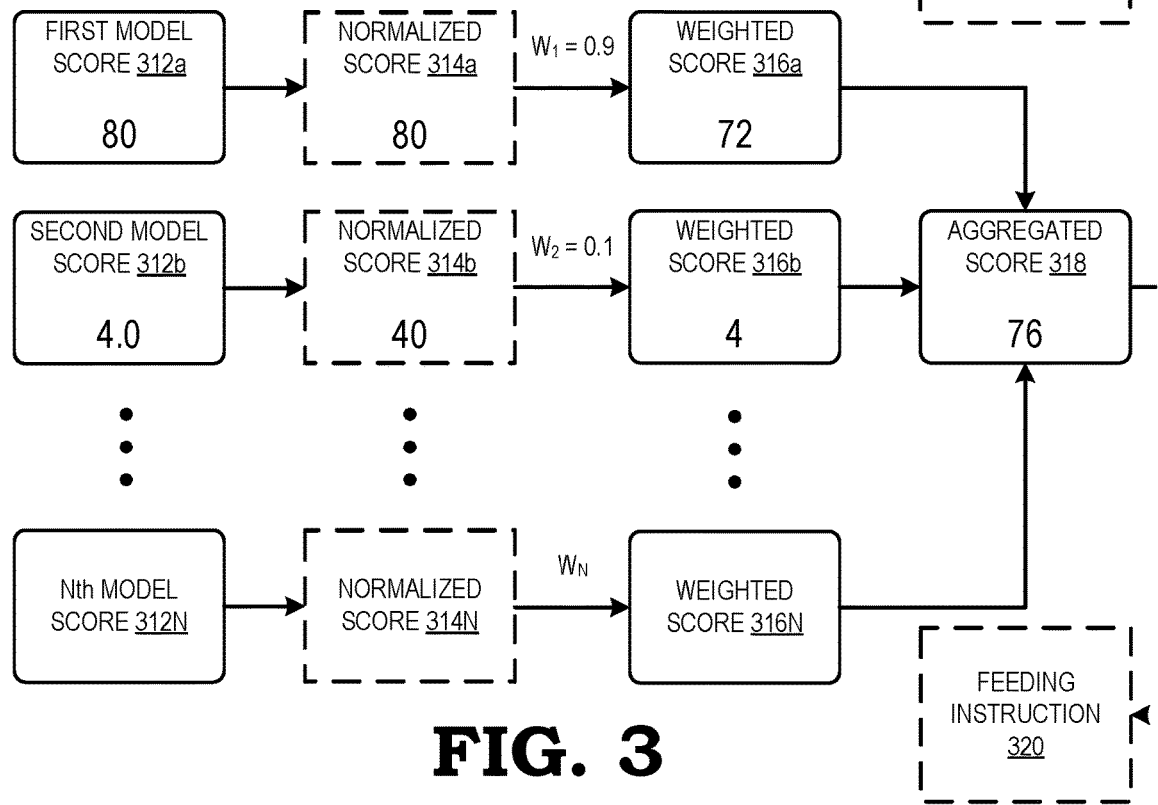

In one embodiment, with respect to FIG. 3 and with continued reference to FIG. 2, a plurality of feeding appetite forecast models (e.g., the first feeding appetite model 222a and the second feeding appetite model 222b) receive their respective inputs (e.g., the feeding parameter data sets 208a and 208b) and generate a plurality of feeding appetite forecasts for a number N of different feeding appetite forecast models (not shown) under a first set of environmental conditions in which the weather is sunny, waters are clean, and waves are choppy. As illustrated in FIG. 3, a first feeding appetite model using acoustic data as input (e.g., first feeding appetite model 222a of FIG. 2) generates a first feeding appetite forecast (e.g., first feeding appetite forecast 224a), as represented by a first model score 302a in FIG. 3. A second feeding appetite model using image data as input (e.g., second feeding appetite model 222b of FIG. 2) generates a second feeding appetite forecast (e.g., second feeding appetite forecast 224b), as represented by a second model score 302b in FIG. 3.

As illustrated, the first model score 302a is 80 on an example scale of 0-100, which is indicative of a relatively high level of forecasted appetite (e.g., as embodied in a forecasted appetite score with a score of 0 representing that every single individual in the population of fish 212 is expected to avoid any and all feed pellets administered and a score of 100 representing that the population of fish 212 is ravenous) for a given time period. The second model score 302b is 8.5 on a different example scale of 0.0-10.0, which is also similarly indicative of a relatively high level of forecasted appetite (e.g., as embodied in a forecasted appetite score with a score of 0.0 representing that every single individual in the population of fish 212 is expected to avoid any and all feed pellets administered and a score of 10.0 representing that the population of fish 212 is ravenous) for a given time period.

As previously discussed in more detail with respect to FIG. 2, the environmental sensors of the third sensor system 202c generate environmental data that serves as reference data for implementing the dynamic weighting of various forecasts from a plurality of feeding appetite forecast models. Although the first model score 302a and the second model score 302b both generally indicate a relatively high level of forecasted appetite, the two scores are represented in differing unit scales (e.g., a first scale having one hundred points from 0-100 and a second scale having ten points from 0.0-10.0). Accordingly, in various embodiments, the processing system 210 optionally (as indicated by the dotted lines) normalizes each of the model scores 302a through 302N to a common scoring scale.

For example, as illustrated in FIG. 3, the processing system 210 normalizes the model scores based on a one hundred point scale to generate a first normalized model score 304a of 80 associated with the first model score 302a of 80. Similarly, the processing system 210 normalizes the second model score 302b of 8.5 based on the same one hundred point scale to generated a second normalized model score 304b of 85. Based on a comparison of the first and second feeding parameter data sets 208a, 208b relative to the measured reference (e.g., environmental) data such as the reference parameter data set 208c, the processing system 210 assigns a first weighting factor $w_1$ of 0.4 to the first feeding appetite forecast model (e.g., the first feeding appetite model 222a of FIG. 2) and its associated first model score 302a and first normalized model score 304a. Additionally, in this example where N=2 for using two different models in forecasting appetite, the processing system 210 also assigns a second weighting factor $w_2$ of 0.6 to the second appetite forecast model (e.g., the second feeding appetite model 222b of FIG. 2) and its associated second model score 302b and second normalized model score 304b.

The processing system 210 assigns this relative weighting with the first weighting factor $w_1$ of 0.4 for the first feeding appetite forecast model (based on acoustic data) and the second weighting factor $w_2$ of 0.6 for the second feeding appetite forecast model (based on image data) due to a first set of environmental conditions (e.g., using environmental data from the environmental sensors to measure conditions for a current time or to forecast for a future time period) in which the weather is sunny, waters are clean, but waves are choppy. At a high level of abstraction, the processing system 210 determines that the image data captured by the second sensor system 202b (which is positively influenced by, for example, ambient light due to the sunny conditions and clear waters) will be of a relatively better quality than the acoustic data captured by the first sensor system 202a (which is negatively influenced by, for example, background sounds due to the choppy waves which decrease the signal-to-noise ratio of acoustic data). Subsequently, the processing system 210 applies the assigned weighting factors $w_1$, $w_2$ to the first normalized model score 304a and the second normalized model score 304b, respectively, to generate a first weighted model score 306a of 32 and a second weighted model score 306b of 51. Further, the processing system 210 combines these two weighted model scores 306a, 306b to generate a weighted, aggregated appetite score 308 of 83 and thereby integrates data from multi-sensor systems to provide an appetite forecast.

In various embodiments, the systems described herein may optionally generate a feeding instruction signal 310 (as represented by the dotted line box) based at least in part on the aggregated appetite score 308 that instructs a user and/or automated feeding system regarding specific actions to be taken in accordance to the feeding appetite prediction (e.g., as quantified by the aggregated appetite score 308). It will be appreciated that the feeding instruction signal 310 is not limited to any particular format and in various embodiments may be converted to any appropriate format to be compatible for intended usage, including control signals for modifying operations of feeding systems and display commands for presenting visual directions regarding feeding. Such formats for the feeding instruction signal 310 include, by way of non-limiting example, a stop signal, a color-coded user interface display, a specific feed rate that should be administered, a total feed volume that should be administered, and the like.

As will be appreciated, environmental conditions often vary and the relative accuracy of data gathered by different sensor systems will also vary over time. In another embodiment, with respect to FIG. 3 and with continued reference to FIG. 2, a plurality of feeding appetite forecast models (e.g., the first feeding appetite model 222a and the second feeding appetite model 222b) receive their respective inputs (e.g., the feeding parameter data sets 208a and 208b) and generate a plurality of feeding appetite forecasts for a number N of different feeding appetite forecast models (not shown) under a second set of environmental conditions in which the weather is dark (e.g., at dusk or dawn), waters have increased turbidity levels, but waves are calm. As illustrated in FIG. 3, a first feeding appetite model using acoustic data as input (e.g., first feeding appetite model 222a of FIG. 2) generates a first feeding appetite forecast (e.g., first feeding appetite forecast 224a), as represented by a first model score 312a in FIG. 3. A second feeding appetite model using image data as input (e.g., second feeding appetite model 222b of FIG. 2) generates a second feeding appetite forecast (e.g., second feeding appetite forecast 224b), as represented by a second model score 312b in FIG. 3.

As illustrated, the first model score 312a is 80 on an example scale of 0-100, which is indicative of a relatively high level of forecasted appetite (e.g., as embodied in a forecasted appetite score with a score of 0 representing that every single individual in the population of fish 212 is expected to avoid any and all feed pellets administered and a score of 100 representing that the population of fish 212 is ravenous) for a given time period. The second model score 312b is 4.0 on a different example scale of 0.0-10.0, which is also similarly indicative of a relatively high level of forecasted appetite (e.g., as embodied in a forecasted appetite score with a score of 0.0 representing that every single individual in the population of fish 212 is expected to avoid any and all feed pellets administered and a score of 10.0 representing that the population of fish 212 is ravenous) for a given time period.

As previously discussed in more detail with respect to FIG. 2, the environmental sensors of the third sensor system 202c generate environmental data that serves as reference data for implementing the dynamic weighting of various forecasts from a plurality of feeding appetite forecast models. The first model score 312a and the second model score 312b are represented in differing unit scales (e.g., a first scale having one hundred points from 0-100 and a second scale having ten points from 0.0-10.0). Accordingly, in various embodiments, the processing system 210 optionally (as indicated by the dotted lines) normalizes each of the model scores 312a through 312N to a common scoring scale.

For example, as illustrated in FIG. 3, the processing system 210 normalizes the model scores based on a one hundred point scale to generate a first normalized model score 314a of 80 associated with the first model score 302a of 80. Similarly, the processing system 210 normalizes the second model score 312b of 4.0 based on the same one hundred point scale to generated a second normalized model score 314b of 40. As previously discussed in more detail with respect to FIG. 2, the environmental sensors of the third sensor system 202c generate environmental data that serves as reference data for implementing the dynamic weighting of various forecasts from a plurality of feeding appetite forecast models. In contrast to the first set of environmental conditions previously described, the second set of environmental conditions describes dark weather (e.g., at dusk or dawn), waters have increased turbidity levels, but waves are calm. Accordingly, based on a comparison of the first and second feeding parameter data sets 208a, 208b relative to the measured reference (e.g., environmental) data such as the reference parameter data set 208c, the processing system 210 assigns a first weighting factor $w_1$ of 0.9 to the first feeding appetite forecast model (e.g., the first feeding appetite model 222a of FIG. 2) and its associated first model score 312a and first normalized model score 314a. Additionally, in this example where N=2 for using two different models in forecasting appetite, the processing system 210 also assigns a second weighting factor $w_2$ of 0.1 to the second appetite forecast model (e.g., the second feeding appetite model 222b of FIG. 2) and its associated second model score 312b and second normalized model score 314b.

At a high level of abstraction, the processing system 210 determines that the acoustic data captured by the first sensor system 202a (which is positively influenced by, for example, calm waters) will have improved quality relative to acoustic data captured by the same first sensor system 202a under less favorable conditions (e.g., the first set of environmental conditions previously described. Additionally, the processing system 210 determines that the image data captured by the second sensor system 202b (which is negatively influenced by, for example, dark ambient light conditions and turbid waters) will have degraded quality (such as due to inaccuracies arising from visibility issues) relative to image data captured by the same second sensor system 202b under more favorable conditions (e.g., the first set of environmental conditions previously described).

Accordingly, the processing system 210 assigns a relative weighting with the first weighting factor $w_1$ of 0.9 for the first feeding appetite forecast model (based on acoustic data) and the second weighting factor $w_2$ of 0.1 for the second feeding appetite forecast model (based on image data) due to the second set of environmental conditions and discounts the image-based, second feeding appetite forecast model that is expected to be less accurate in murky waters. Subsequently, the processing system 210 applies the assigned weighting factors $w_1$, $w_2$ to the first normalized model score 314a and the second normalized model score 314b, respectively, to generate a first weighted model score 316a of 72 and a second weighted model score 316b of 4. Further, the processing system 210 combines these two weighted model scores 316a, 316b to generate a weighted, aggregated appetite score 318 of 76 and thereby integrates data from multi-sensor systems (some sensors and predictive models being more accurate than others, sometimes in all instances or sometimes depending on variable factors such as the environment) measuring fish positions as an approximation of appetite to provide an appetite forecast.

In various embodiments, the systems described herein may optionally generate a feeding instruction signal 320 (as represented by the dotted line box) based at least in part on the aggregated appetite score 318 that instructs a user and/or automated feeding system regarding specific actions to be taken in accordance to the feeding appetite prediction (e.g., as quantified by the aggregated appetite score 318). It will be appreciated that the feeding instruction signal 320 is not limited to any particular format and in various embodiments may be converted to any appropriate format to be compatible for intended usage, including control signals for modifying operations of feeding systems and display commands for presenting visual directions regarding feeding. Such formats for the feeding instruction signal 320 include, by way of non-limiting example, a stop signal, a color-coded user interface display, a specific feed rate that should be administered, a total feed volume that should be administered, and the like.

Figure 4:
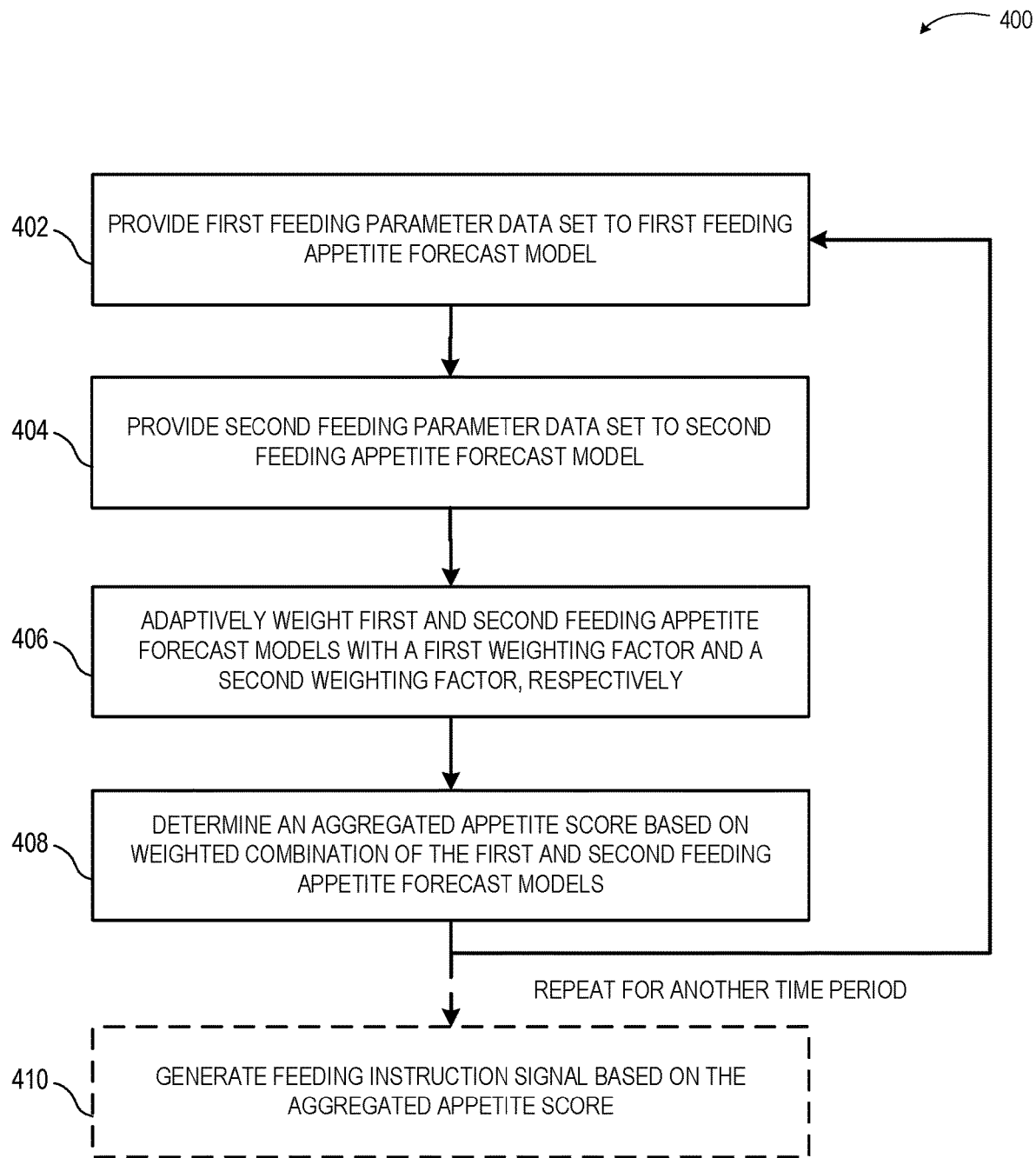
FIG. 4 is a flow diagram of a method for providing a feeding appetite forecast in accordance with some embodiments.

Referring now to FIG. 4, illustrated is a flow diagram of a method 400 for providing a feeding appetite forecast in accordance with some embodiments. For ease of illustration and description, the method 400 is described below with reference to and in an example context of the systems 100 and 200 of FIG. 1 and FIG. 2, respectively. However, the method 400 is not limited to this example context, but instead may be employed for any of a variety of possible system configurations using the guidelines provided herein.

The method 400 begins at block 402 with the receipt by a first feeding appetite forecast model 222a of a first feeding parameter data set 208a associated with a first feeding parameter. In various embodiments, the operations of block 402 include providing, by a processing system, the first feeding parameter data set 208a via a wireless or wired communications link to the first feeding appetite forecast model 222a for processing. For example, in the context of FIGS. 1 and 2, the sensor systems 102, 202 communicate at least the first parameter data set 108a, 208a to a processing system 110, 210 for storage at a local storage device 116. As illustrated in FIG. 2, the first feeding appetite forecast model 222a is executed locally using the same processing system 210 at which the first parameter data set 208a is stored. Accordingly, the first parameter data set 208a may be so provided to the first appetite forecast model 222a by transmitting one or more data structures to processors 112 via a wireless or wired link (e.g., communications bus 114) for processing. It should be noted that the first parameter data set and the first appetite forecast model do not need to be stored and/or processed at the same device or system. Accordingly, in various embodiments, the providing of the first parameter data set and its receipt by the first appetite forecast model for the operations of block 402 may be implemented in any distributed computing configuration (e.g., such as amongst the processing system 110, network 120, remote platforms 122, external resources 124, and server 126 of FIG. 1).

In at least one embodiment, the first parameter data set 108a, 208a includes data corresponding to measurements for at least a first feeding parameter related to feeding appetite forecasting. For example, with reference to FIG. 2, the first feeding parameter includes acoustic data corresponding to the presence (or absence), abundance, distribution, size, and behavior of underwater objects (e.g., a population of fish 212 as illustrated in FIG. 2). Such acoustic data measurements may therefore measure fish positions within the water to be used as an approximation of appetite. Although described here in the context of acoustic data characterizing physical properties of the population of fish 212 (e.g., location of the fish within the underwater environment 204), acoustic data related to physical properties of other underwater objects such as feed 214 may also be measured for the first parameter data set 208a.

Additionally, in various embodiments, acoustic data related to behavior of underwater objects may also be measured for the first parameter data set 208a. In the context of feeding behavior, a hydroacoustic sensor of the first sensor system 202a may monitor noises generated by the population of fish 212 during feeding (e.g., chomping noises resulting from jaw movement while the fish eat) as indicators of appetite. Similarly, in the context of swimming behavior, a hydroacoustic sensor of the first sensor system 202 may monitor movement noises generated by the population of fish during feeding (e.g., noises resulting from swimming motion towards or away from feed pellets 214) such that a reduction in noise may be indicative of reduced fish appetites as they swim away from the feed pellets 214.

The method 400 continues at block 404 with the receipt by a second feeding appetite forecast model 222b (that is different from the first forecast model) of a second feeding parameter data set 208b associated with a second feeding parameter. In various embodiments, the operations of block 404 include providing, by a processing system, the second feeding parameter data set 208b via a wireless or wired communications link to the second feeding appetite forecast model 222b for processing. For example, in the context of FIGS. 1 and 2, the sensor systems 102, 202 communicate at least the second parameter data set 108b, 208b to a processing system 110, 210 for storage at a local storage device 116. As illustrated in FIG. 2, the second feeding appetite forecast model 222b is executed locally using the same processing system 210 at which the second parameter data set 208b is stored. Accordingly, the second parameter data set 208b may be so provided to the second appetite forecast model 222b by transmitting one or more data structures to processors 112 via a wireless or wired link (e.g., communications bus 114) for processing. It should be noted that the second parameter data set and the second appetite forecast model do not need to be stored and/or processed at the same device or system. Accordingly, in various embodiments, the providing of the second parameter data set and its receipt by the second appetite forecast model for the operations of block 404 may be implemented in any distributed computing configuration (e.g., such as amongst the processing system 110, network 120, remote platforms 122, external resources 124, and server 126 of FIG. 1).

In at least one embodiment, the second parameter data set 108b, 208b includes data corresponding to measurements for at least a second feeding parameter related to feeding appetite forecasting. For example, with reference to FIG. 2, the second feeding parameter includes image data corresponding to the presence (or absence), abundance, distribution, size, and behavior of underwater objects (e.g., a population of fish 212 as illustrated in FIG. 2). Such image data may be analyzed using various image analysis techniques to identify various physical properties associated with the population of fish 212 such as fish positions within the water, depth within the water, estimated biomass, biomass location within the water, and the like to be used as an approximation of appetite. Further, image data related to properties of other underwater objects may also be measured for the second parameter data set 208b.

Additionally, in various embodiments, image data related to behavior of underwater objects may also be measured for the second parameter data set 208b. In the context of feeding behavior, an image sensor of the second sensor system 202b may identify swimming behavior of the population of fish 212 during feeding as indicators of appetite. For example, congregation of fish close to and in a circling pattern proximate a physical source of feed pellets 214 may indicate a higher level of appetite than swimming behavior that is akin to a random walk pattern. Similarly, in the context of feed pellet behavior, an image sensor of the second sensor system 202b may monitor the falling paths of feed pellets 214 such that an increase in amount of feed pellets 214 that pass the population of fish 212 without being eaten (e.g., washed away by water currents or falls out of an enclosure within which the population of fish 212 are positioned) may be indicative of reduced fish appetites.

It should be recognized that although feeding appetite forecasting was previously described with respect to FIGS. 1-4 in the context underwater acoustic sensors, underwater image sensors, and underwater environmental sensors, data may be collected by any of a variety of imaging and non-imaging sensors. By way of non-limiting examples, in various embodiments, the sensor systems may include various sensors local to the site at which the fish are located (e.g., underwater telemetry devices and sensors), sensors remote to the fish site (e.g., satellite-based weather sensors such as scanning radiometers), various environmental monitoring sensors, active sensors (e.g., active sonar), passive sensors (e.g., passive acoustic microphone arrays), echo sounders, photo-sensors, ambient light detectors, accelerometers for measuring wave properties, salinity sensors, thermal sensors, infrared sensors, chemical detectors, temperature gauges, or any other sensor configured to measure data that would have an influence on feeding appetite. It should be recognized that, in various embodiments, the sensor systems utilized herein are not limited to underwater sensors and may include combinations of a plurality of sensors at different locations, such as illustrated and described below with respect to FIG. 5. It should also be recognized that, in various embodiments, the sensor systems utilized herein are not limited to sensors of differing parameter types. For example, in various embodiments, the sensor systems may include two different image-data based sensor systems positioned at different locations (e.g., under water and above water as illustrated and described below with respect to FIG. 5) and/or a plurality of differing reference sensors.

The operations of method 400 continues at block 406 with adaptively weighting the first feeding appetite forecast model with a first weighting factor relative to a second weighting factor for the second feeding appetite forecast model. The operations of block 406 includes providing measured reference data related to the first feeding parameter and the second feeding parameter. In various embodiments, providing measured reference data includes the third sensor system 202c generating environmental data and providing the reference parameter data set 208c via a wireless or wired communications link to the processing system 210 for local storage and processing. It should be noted that the reference parameter data set 208c does not need to be stored at the same device or system at which the reference parameter data set 208c is processed to determine weighting factors. Accordingly, in various embodiments, the providing of the reference parameter data set 208c and its receipt by the processing system 210 for the operations of block 406 may be implemented in any distributed computing configuration (e.g., such as amongst the processing system 110, network 120, remote platforms 122, external resources 124, and server 126 of FIG. 1).

In at least one embodiment, the reference parameter data set 208c includes measured environmental reference data that is relevant to the precision/accuracy of individual feeding appetite forecast models, the relative precision/accuracy between different feeding appetite forecast models, relative availability or reliability of data captured by any of the sensor systems discussed herein, and the like. Accordingly, in various embodiments, the processing system 210 assigns, based on a comparison of the forecast models with the measured reference data, a first weight factor to the first feeding appetite forecast model and a second weight factor to the second feeding appetite forecast model.

With reference to FIGS. 2-3, the third sensor system 202c of FIG. 2 includes one or more environmental sensors configured to capture measurements associated with the environment 204 within which the system 200 is deployed and generate environmental data that serves as reference data for implementing the dynamic weighting of various forecasts from a plurality of feeding appetite forecast models. In one embodiment, the environmental sensors of the third sensor system 202c includes a turbidity sensor configured to measure an amount of light scattered by suspended solids in the water.

With reference to the first set of environmental conditions in FIG. 3, as determined based at least in part on environmental data from the environmental sensors to identify conditions in which the weather is sunny plus waters are choppy but clean (e.g., based on the turbidity sensor measurements), the processing system 210 determines that the image data captured by the second sensor system 202b (which is positively influenced by, for example, ambient light due to the sunny conditions and clear waters) will be of a relatively better quality than the acoustic data captured by the first sensor system 202a (which is negatively influenced by, for example, background sounds due to the choppy waves which decrease the signal-to-noise ratio of acoustic data). For example, in some embodiments, the processing system 210 preferentially weights the image-based, second feeding appetite forecast model over the acoustics-based, first feeding appetite forecast model based on a clarity level of the water exceeding a predetermined threshold. Accordingly, the operations of block 406 include the processing system 210 assigning a relative weighting with the first weighting factor $w_1$ of 0.4 for the first feeding appetite forecast model and the second weighting factor $w_2$ of 0.6 for the second feeding appetite forecast model to account for differential forecasts in a multi-sensor system.

As will be appreciated, environmental conditions often vary and the relative accuracy of data gathered by different sensor systems will also vary over time. With reference to the second set of environmental conditions in FIG. 3, as determined based at least in part on environmental data from the environmental sensors to identify conditions for a second, future period of time in which the weather is expected to be dark (e.g., at dusk or dawn), waters have increased turbidity levels, but waves are calm, the processing system 210 determines that the image-based, second feeding appetite forecast model is expected to be less accurate in murky waters along with low ambient light levels. Thus, the processing system 210 will adaptively re-weight the weightings assigned to different forecast models (relative to the weightings assigned with respect to the first set of environmental conditions). Accordingly, the operations of block 406 include the processing system 210 assigning a relative weighting with the first weighting factor $w_1$ of 0.9 for the first feeding appetite forecast model (based on acoustic data) and the second weighting factor $w_2$ of 0.1 for the second feeding appetite forecast model (based on image data) to discount the image-based, second feeding appetite forecast model that is expected to be less accurate in dark and murky waters.

It should be recognized that although the weighting of different appetite forecast models is described in the specific context of variable turbidity level measurements and forecasts, the operations of block 406 may involve weighting considerations including any number of and any combination of parametric considerations (including data sets collected from a plurality of different environmental sensors including photodetectors to detect ambient light conditions and accelerometers to measure wave heights/swell periods, as referenced above but not explicitly discussed) without departing from the scope of this disclosure. For example, such parametric environmental considerations may include data sets related to one or more water environment parameters, meteorological parameters, forecasts of the same for future time periods, and the like.

Further, it will be appreciated that various non-environmental considerations also have relevance as to the precision/accuracy of individual feeding appetite forecast models, the relative precision/accuracy between different feeding appetite forecast models, relative availability or reliability of data captured by any of the sensor systems discussed herein, and the like. In various embodiments, sensor measurements corresponding to different data sets (e.g., first and second parameter data sets 108a, 108b) may be captured with differing temporal granularities. For example, in one hypothetical situation and with reference back to system 200, the image-based second set of sensors may be configured to decrease a frame rate of image capture in response to low-bandwidth issues. However, the acoustics-based first set of sensors may not be subject to such performance throttling as audio files generally occupy less storage space and consume less bandwidth for transfer. In such a hypothetical situation, a rate of sensor data capture serves as the reference parameter to be the basis for relative weighting of different appetite forecast parameters instead of measured environmental data, whereby the processing system 210 preferentially underweights an appetite forecast model based on its access to a lower quantity of data until low-bandwidth conditions are resolved. Similarly, in another hypothetical situation, the image-based second set of sensors may be configured to downsample captured images prior to transmission to the processing system 210 in response to low-bandwidth issues. In such a hypothetical situation, a qualitative measure of data (such as relative to an expected baseline) serves as the reference parameter to be the basis for relative weighting of different appetite forecast parameters instead of measured environmental data, whereby the processing system 210 preferentially underweights an appetite forecast model based on its access to a lower quality of data until low-bandwidth conditions are resolved.

Sensor measurements corresponding to different data sets (e.g., first and second parameter data sets 108a, 108b) may be captured with differing spatial granularities. With reference back to system 200, an image-based second set of sensors may be configured such that a single camera is oriented to capture underwater imagery at a farming site containing multiple sea cages (not shown) that each hold a different population of fish 212 in one embodiment. In another embodiment, an image-based second set of sensors may be configured such that a camera is allocated for each of the multiple sea cages. In yet another embodiment, an image-based second set of sensors may be configured such that multiple cameras are allocated for each of the multiple sea cages (e.g., each of the multiple cameras monitoring a different portion within the volume of the sea cage). As will be appreciated, each of these different embodiments captures image data at a different spatial granularity with respect to the amount of area encompassing each camera's field of view. Across such embodiments, a resolution of data capture as it relates to spatial granularity serves as the reference parameter to be the basis for weighting of appetite forecast parameters. For example, the processing system 210 may preferentially overweight an appetite forecast model based on its access to multiple camera streams covering multiple points of view.

It will also be appreciated that the granularity concept is applicable not only to relative weightings between different feeding appetite forecast models but also to weightings as to which reference parameters should be more or less influential in the determination of model weightings. For example, with respect to spatial granularity, consider a first hypothetical having a first set of environmental conditions such as previously described with reference to FIG. 3 in which the weather is sunny, waters are clean, and waves are choppy. In this first hypothetical, the environmental conditions are determined based on environmental sensors (e.g., using the third sensor system 202c) that measure and generate environmental data locally at a location proximate to the population of fish 212 and the processing system 210 generates the relative weightings of FIG. 3.

Now consider a second hypothetical having a second set of environmental conditions similar to the first set in which the weather is sunny, waters are clean, and waves are choppy. However, in this second hypothetical, reference data corresponding to the sunny weather conditions is measured and generated at a weather sensing station that is remotely located away from the location of the population of fish 212. For example, in some embodiments, the weather data includes remote sensing data from satellite imagery and data, for example with a resolution of approximately 1000 square miles. In other embodiments, the weather data includes remote sensing upper air (e.g., as captured via radiosondes and the like) data with a resolution of approximately 100 square miles. In other embodiments, the weather data includes surface coastal station data with higher accuracy but a resolution of approximately 10 square miles. Further, in various embodiments, the weather data includes measurements from, for example, in-situ sensors including buoys, gliders, flying drones, and the like with varying degrees of accuracy and resolution. As will be appreciated, the varying spatial granularity at which these weather sensors capture data will affect the underlying feeding appetite forecast models and the relative weights assigned to different feeding appetite forecasts. Accordingly, in this second hypothetical, the processing system 210 will give less weight to the sunny weather conditions (relative to its importance with respect to the first hypothetical discussed above) due to the lesser spatial granularity of sunny weather being determined by a remote weather sensor. For example, the processing system 210 may assign a second weighting factor $w_2$ of less than 0.6 to the image-based, second appetite forecast model to account for an increase in uncertainty as to whether the sunny conditions measured by the remote sensor are indeed applicable to the local micro-climate at which the population of fish 212 are location.

Additionally, it will be appreciated that the various non-environmental considerations discussed herein are not limited to differing granularities at which data is collected and/or analyzed (e.g., temporal, spatial, qualitative, quantitative, or any other categorization in which data may be assigned relative coarse-to-fine assignments). In some embodiments, the reference data includes an actual amount of feed given for a prior time period. That is, rather than the reference parameter data set 208c corresponding to measured environmental data, the reference parameter data set 208c includes data corresponding to how much feed the population of fish 212 actually ate within each of one or more time intervals (e.g., days, hours, minutes, or any other block of time) for which an amount of administered feed is measured. The one or more time intervals for which model weighting is applied are approximately equal in length to each other, but the length may vary and may be selected based on various factors including availability of data, desired degree of accuracy, and the like.

In various embodiments, assigning of the relative weight factors between a first weight factor and a second weight factor (e.g., first and second weighting factors $w_1$, $w_2$ of FIG. 3) includes assigning the first weight factor based on a comparison of a first predicted feed amount provided by the first feeding appetite forecast model relative to the actual amount of feed given for the prior time period. Further, assigning of the relative weight factors includes assigning the second weight factor based on a comparison of a second predicted feed amount provided by the second feeding appetite forecast model relative to the actual amount of feed given for the prior time period. For example, in one embodiment, the actual amount of feed given for the prior time period (e.g., prior full day of feeding) corresponds to data regarding an amount of feed given to a population of fish by an experienced feeder. In this manner, the processing system compares a predicted amount of feed associated with the first feeding appetite forecast model from the prior day and also a predicted amount of feed associated with the second feeding appetite forecast model from the prior day relative to the actual amount of feed given. Using this comparison, the processing system may assign relative weightings to the two or more different appetite forecast models based at least in part on their respective capabilities to predict the approximate actions that the experienced feeder would have taken.

In other embodiments, the reference data includes a calculated amount such as a feed table amount of feed calculated to be given for a prior time period. That is, rather than the reference parameter data set 208c corresponding to measured environmental data, the reference parameter data set 208c includes data corresponding to a feed table for calculating feed rations (e.g., a daily feed ration). Such feed tables may be provided by feed manufacturers to provide feeding recommendations that provide approximations based on raw numbers of individual fish to be fed and total biomass. In various embodiments, assigning of the relative weight factors between a first weight factor and a second weight factor (e.g., first and second weighting factors $w_1$, $w_2$ of FIG. 3) includes assigning the first weight factor based on a comparison of a first predicted feed amount provided by the first feeding appetite forecast model relative to the feed table amount of feed calculated for the prior time period. Further, assigning of the relative weight factors includes assigning the second weight factor based on a comparison of a second predicted feed amount provided by the second feeding appetite forecast model relative to the feed table amount of feed calculated for the prior time period. Using this comparison, the processing system may assign relative weightings to the two or more different appetite forecast models based at least in part on their respective capabilities to not deviate significantly from a known metric against which industry is comfortable comparing feeding forecast models against.

In various embodiments, the processing systems described herein use one or more learned models (not shown) to determine the relative weightings that should be assigned to various feeding appetite forecast models and/or to reference parameters against which influence the various feeding appetite forecast models. Further, additional inputs provided, or the results of feeding according to the forecasted appetite, or both, then are incorporated into the learned model so that the learned model evolves to facilitate the subsequent performance of similar feeding appetite forecasting. In various embodiments, the learned model includes a system represented by one or more data structures, executable instructions, or combinations thereof, that is trained and having an internal representation modified or adapted based in input or experience during the training process. One example of the learned model is a neural network. Other implementations include parametric representations, such as coefficients for dynamics models, latent or explicit embedding into metric spaces for methods like nearest neighbors, or the like.

In some embodiments, the learned model is initialized through a supervised learning process (e.g., a "learning by demonstration" process) so as to obtain a baseline set of knowledge regarding the operational environment 104, 204 and the performance of at least certain feeding appetite forecasts by the systems 100, 200. In other embodiments, the learned model may be initiated at a particular processing system (e.g., processing systems 110 and 210) by, for example, populating the learned model with the knowledge of a learned model of other similar appetite forecast models, forecast models optimized for different locales, or a "default knowledge core" maintained by the processing systems 110, 210 for distribution to each feeding appetite forecast as additional sensor systems 102 and/or parameter data sets 108 are integrated into the systems 100, 200 or otherwise become available to storage and processing.

With the relative weightings assigned to their respective feeding appetite forecast models, at block 408 the processing system determines an aggregated appetite score based on a weighted combination of the appetite forecasts from a plurality of feeding appetite forecast models. In this context, the "weighted combination" and "aggregated appetite score" can be specified in various ways, depending on the goals and parametric outputs specified by the systems 100, 200. For example, in one embodiment and with reference to FIG. 3, determining the aggregated appetite score includes normalizing a first model score 302a of 80 (e.g., based on a first scale having one hundred points from 0-100) and a second model score 302b of 8.5 (e.g., based on a second scale having ten points from 0.0-10.0) to a common unit scale (i.e., the same one hundred point scale) to generate a normalized score for the first and second model scores 302a, 302b. In particular, the processing system 210 normalizes the model scores based on a one hundred point scale to generate a first normalized model score 304a of 80 associated with the first model score 302a and a second normalized model score 304b of 85 associated with the second model score 302b. Subsequently, the processing system 210 applies the assigned weighting factors $w_1=0.4$ and $w_2=0.6$ to the first normalized model score 304a and the second normalized model score 304b, respectively, to generate a first weighted model score 306a of 32 and a second weighted model score 306b of 51. Further, the processing system 210 combines these two weighted model scores 306a, 306b to generate a weighted, aggregated appetite score 308 of 83 and thereby integrates data from multi-sensor systems to provide an appetite forecast.

Those skilled in the art will recognize that the example aggregated appetite score of FIG. 3 based on a scale having one hundred points from 0-100 is provided only for illustrative purposes to give a concrete example of the weighting and score aggregation operations discussed herein. However, any of a variety of unit scales and/or user interface schemes may be implemented for representing the aggregated appetite score. For example, in any of the exemplary systems disclosed here, color coding may be used to indicate categories of any parameter. For example, in the display of a user interface, color coding may be used to indicate whether a population of fish is predicted to be starving (e.g., with the color red), hungry (e.g., with the color yellow), or satiated (e.g., with the color green). Similarly, color coding may be used to indicate whether a feeder should, based on the aggregated appetite, stop feeding due to reaching satiation (e.g., with the color red), begin monitoring for signs of satiation (e.g., with the color yellow), or begin/continue feeding (e.g., with the color green).

Returning now to numerical representations of the aggregated appetite score, those skilled in the art will recognize that the aggregated appetite score is not limited to providing a metric associated with hunger levels but may instead (or additionally) prescribe specific actions to be taken. For example, in some embodiments, the processing system 110, 210 uses the aggregated appetite score to determine a predicted amount of feed to administer for a particular time period. Such an output may be provided to, for example, automated feeding systems to eliminate or reduce human intervention as it associates to feeding activities. Further, the unit interval within a scale is not limited to being linear and in various embodiments, the unit interval is transformed to have any desired distribution within a scale (e.g., a scale including 100 points from 0 to 100), for example, arctangent, sigmoid, sinusoidal, and the like. In certain distributions, the intensity values increase at a linear rate along the scale, and in others, at the highest ranges the intensity values increase at more than a linear rate to indicate that it is more difficult to climb in the scale toward the extreme end of the scale. In some embodiments, the raw intensity scores are scaled by fitting a curve to a selected group of canonical exercise routines that are predefined to have particular intensity scores.

Thus, the operations of method 400 provides variable and relative weighting to different feeding appetite predictions from different feeding appetite forecast models and combines them into an aggregated appetite score that is more accurate than would be individually provided by each feeding appetite forecast model by itself. It should be noted that the method 400 is illustrated as a single instance of relative weighting between two appetite forecast models based on a single reference parameter for ease of illustration and description. However, in some embodiments, after a single pass through the operations of blocks 402-408 is completed for determining an appetite forecast for a first time period, the operations of blocks 402-408 may be repeated for additional passes to determine an appetite forecast for a second time period (e.g., such as to provide continually updating forecasts) or a different time period interval (e.g., such as to provide more or less granular forecasts). In some embodiments, after a single pass through the operations of blocks 402-408 is completed for determining an appetite forecast, the operations of blocks 402-408 may be repeated for re-weighting as environmental conditions change, refining of relative weightings to adjust for additional factors (e.g., consideration of more than one reference parameter data set), and the like.

Figure 5:
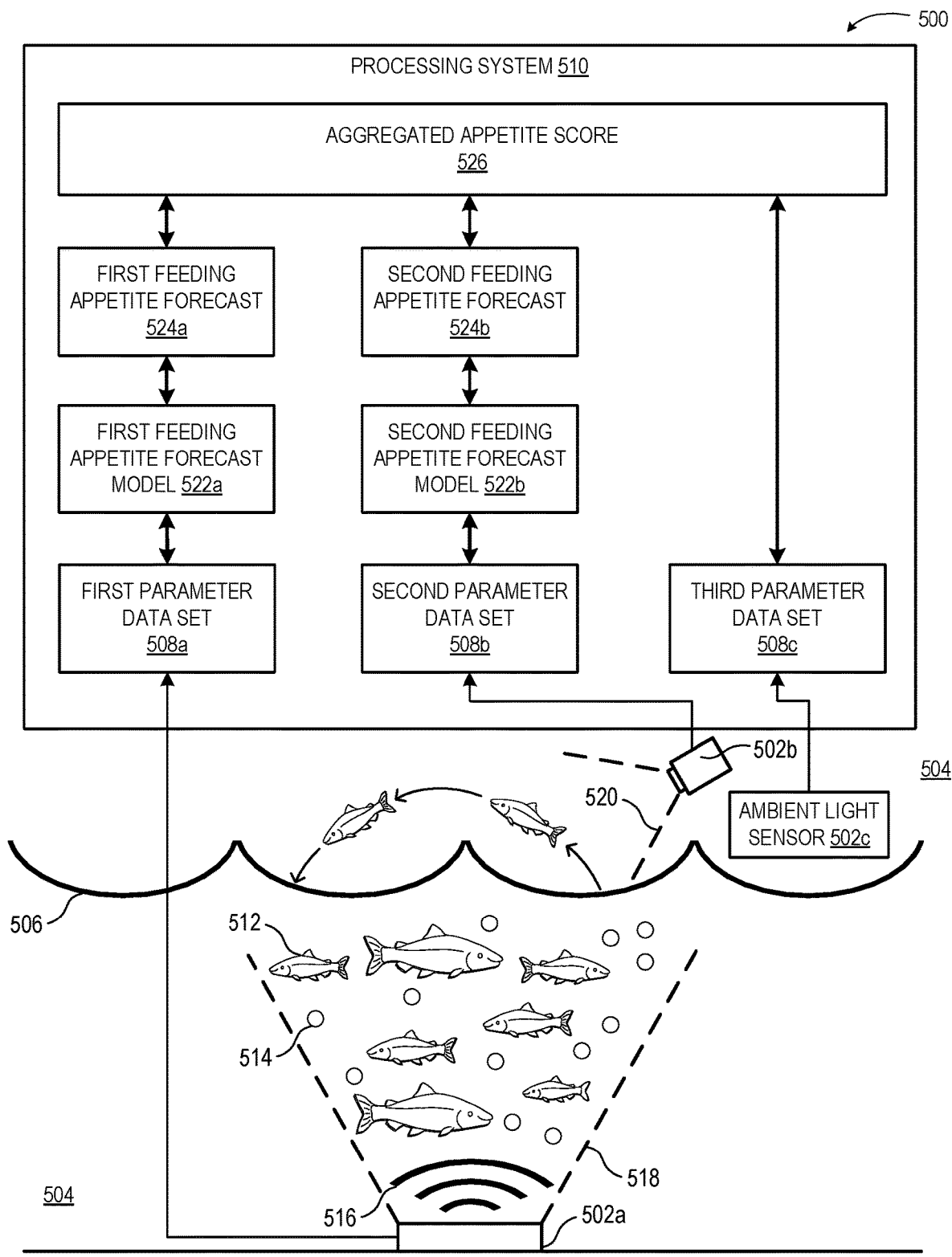
FIG. 5 is a diagram illustrating a forecast system implementing a set of underwater sensors and a set of out of water sensors in accordance with some embodiments.

Referring now to FIG. 5, illustrated is a diagram showing a system 500 implementing a set of underwater sensors and a set of out of water sensors in accordance with some embodiments. In various embodiments, the system 500 includes a plurality of sensor systems 502 that are each configured to monitor and generate data associated with the environment 504 within which they are placed. As shown, the plurality of sensor systems 502 includes a first sensor system 502a positioned below the water surface 506 and including a first set of one or more sensors. The first set of one or more sensors are configured to monitor the environment 504 below the water surface 506 and generate data associated with a first feeding parameter. In particular, the first sensor system 502a of FIG. 5 includes one or more hydroacoustic sensors (e.g., similar to those previously discussed with respect to FIG. 2) configured to observe fish behavior and capture measurements associated with feeding parameters related to fish appetite. For example, in various embodiments, the hydroacoustic sensors are configured to capture acoustic data corresponding to the presence (or absence), abundance, distribution, size, location, and/or behavior of underwater objects (e.g., a population of fish 512 as illustrated in FIG. 5 or feed pellets 514). Such acoustic data measurements may therefore measure fish positions within the water to be used as an approximation of appetite.

The one or more hydroacoustic sensors of the first sensor system 502a includes one or more of a passive acoustic sensor and/or an active acoustic sensor (e.g., an echo sounder and the like). Passive acoustic sensors generally listen for remotely generated sounds (e.g., often at specified frequencies or for purposes of specific analyses, such as for detecting fish or feed in various aquatic environments) without transmitting into the underwater environment 504. In contrast, active acoustic sensors conventionally include both an acoustic receiver and an acoustic transmitter that transmit pulses of sound (e.g., pings) into the surrounding environment 504 and then listens for reflections (e.g., echoes) of the sound pulses. It is noted that as sound waves/pulses travel through water, it will encounter objects having differing densities or acoustic properties than the surrounding medium (i.e., the underwater environment 504) that reflect sound back towards the active sound source(s) utilized in active acoustic systems. For example, sound travels differently through fish 512 (and other objects in the water such as feed pellets 514) than through water (e.g., a fish's air-filled swim bladder has a different density than water). Accordingly, differences in reflected sound waves from active acoustic techniques due to differing object densities may be accounted for in the detection of aquatic life and estimation of their individual sizes or total biomass.

In various embodiments, the first sensor system 502a utilizes active sonar systems in which pulses of sound are generated using a sonar projector including a signal generator, electro-acoustic transducer or array, and the like. The active sonar system may further include a beamformer (not shown) to concentrate the sound pulses into an acoustic beam 516 covering a certain search angle 518. In some embodiments, the first sensor system 502a measures distance through water between two sonar transducers or a combination of a hydrophone (e.g., underwater acoustic microphone) and projector (e.g., underwater acoustic speaker). In some embodiments, the first sensor system 502a includes sonar transducers (not shown) for transmitting and receiving acoustic signals (e.g., pings). To measure distance, one transducer (or projector) transmits an interrogation signal and measures the time between this transmission and the receipt of a reply signal from the other transducer (or hydrophone). The time difference, scaled by the speed of sound through water and divided by two, is the distance between the two platforms. This technique, when used with multiple transducers, hydrophones, and/or projectors calculates the relative positions of objects in the underwater environment 504.

In other embodiments, the first sensor system 202a includes an acoustic transducer configured to emit sound pulses into the surrounding water medium. Upon encountering objects that are of differing densities than the surrounding water medium (e.g., the fish 212), those objects reflect back a portion of the sound towards the sound source (i.e., the acoustic transducer). Due to acoustic beam patterns, identical targets at different azimuth angles will return different echo levels. Accordingly, if the beam pattern and angle to a target is known, this directivity may be compensated for. In various embodiments, split-beam echosounders divide transducer faces into multiple quadrants and allow for location of targets in three dimensions. Similarly, multibeam sonar projects a fan-shaped set of sound beams outward from the first sensor system 202a and record echoes in each beam, thereby adding extra dimensions relative to the narrower water column profile given by an echosounder. Multiple pings may thus be combined to give a three-dimensional representation of object distribution within the water environment 204.

In some embodiments, the one or more hydroacoustic sensors of the first sensor system 202a includes a Doppler system using a combination of cameras and utilizing the Doppler effect to monitor the appetite of salmon in sea pens. The Doppler system is located underwater and incorporates a camera, which is positioned facing upwards towards the water surface 206. In various embodiments, there is a further camera integrated in the transmission device normally positioned on the top-right of the pen, monitoring the surface of the pen. The sensor itself uses the Doppler effect to differentiate pellets from fish. The sensor produces an acoustic signal and receives the echo. The sensor is tuned to recognize pellets and is capable of transmitting the information by radio link to the feed controller over extended distances. The user watches the monitor and determines when feeding should be stopped. Alternatively, a threshold level of waste pellets can be set by the operator, and the feeder will automatically switch off after the threshold level is exceeded.

In other embodiments, the one or more hydroacoustic sensors of the first sensor system 202a includes an acoustic camera having a microphone array (or similar transducer array) from which acoustic signals are simultaneously collected (or collected with known relative time delays to be able to use phase different between signals at the different microphones or transducers) and processed to form a representation of the location of the sound sources. In various embodiments, the acoustic camera also optionally includes an optical camera.

Additionally, as illustrated in FIG. 5, the plurality of sensor systems 502 includes a second sensor system 502b positioned above the water surface 506 and including a second set of one or more sensors. The second set of one or more sensors are configured to monitor the environment 504 proximate to (e.g., at the water surface or even slightly underwater if the one or more sensors are capable of imaging) and above the water surface 506 and generate data associated with a second feeding parameter. In particular, the second sensor system 502b of FIG. 5 includes one or more imaging sensors configured to observe fish behavior and capture measurements associated with feeding parameters related to fish appetite. In various embodiments, the imaging sensors are configured to capture image data corresponding to, for example, the presence (or absence), abundance, distribution, size, and behavior of objects (e.g., a population of fish 512 as illustrated in FIG. 5). Such image data measurements may therefore be used to identify fish activity for approximation of appetite. It should be recognized that although specific sensors are described below for illustrative purposes, various imaging sensors may be implemented in the systems described herein without departing from the scope of this disclosure.

In some embodiments, the imaging sensors of the second sensor system 502b includes one or more cameras configured to capture still images and/or record moving images (e.g., video data). The one or more cameras are directed towards the environment proximate the water surface 506, with each camera capturing a sequence of images (e.g., video frames) of the environment 504 and any objects in the environment. In various embodiments, each camera has a different viewpoint or pose (i.e., location and orientation) with respect to the environment. Although FIG. 5 only shows a single camera for ease of illustration and description, persons of ordinary skill in the art having benefit of the present disclosure should appreciate that the second sensor system 502b can include any number of cameras and which may account for parameters such as each camera's horizontal field of view, vertical field of view, and the like. Further, persons of ordinary skill in the art having benefit of the present disclosure should appreciate that the second sensor system 502b can include any arrangement of cameras (e.g., cameras positioned on different planes relative to each other, single-plane arrangements, spherical configurations, and the like).

In various embodiments, the imaging sensors of the second sensor system 502b includes a first camera (or lens) having a particular field of view 520 as represented by the dashed lines that define the outer edges of the camera's field of view that images the environment 504 or at least a portion thereof. For the sake of clarity, only the field of view 520 for a single camera is illustrated in FIG. 5. In various embodiments, the imaging sensors of the second sensor system 502b includes at least a second camera (or lens) having a different but overlapping field of view (not shown) relative to the first camera (or lens). Images from the two cameras therefore form a stereoscopic pair for providing a stereoscopic view of objects in the overlapping field of view. Further, it should be recognized that the overlapping field of view is not restricted to being shared between only two cameras. For example, at least a portion of the field of view 520 of the first camera of the second sensor system 502b may, in some embodiments, overlap with the fields of view of two other cameras to form an overlapping field of view with three different perspectives of the environment 504.

In some embodiments, the imaging sensors of the second sensor system 502b includes one or more light field cameras configured to capture light field data emanating from the surrounding environment 504. In other words, the one or more light field cameras captures data not only with respect to the intensity of light in a scene (e.g., the light field camera's field of view/perspective of the environment) but also the directions of light rays traveling in space. In contrast, conventional cameras generally record only light intensity data. In other embodiments, the imaging sensors of the second sensor system 502b includes one or more range imaging cameras (e.g., time-of-flight and LIDAR cameras) configured to determine distances between the camera and the subject for each pixel of captured images. For example, such range imaging cameras may include an illumination unit (e.g., some artificial light source) to illuminate the scene and an image sensor with each pixel measuring the amount of time light has taken to travel from the illumination unit to objects in the scene and then back to the image sensor of the range imaging camera.

It should be noted that the various operations are described here in the context of multi-camera or multi-lens cameras for ease of description and illustration. However, it should be recognized that the operations described herein may similarly be implemented with any type of imaging sensor without departing from the scope of this disclosure. For example, in various embodiments, the imaging sensors of the second sensor system 502b may include, but are not limited to, any of a number of types of optical cameras (e.g., RGB and infrared), thermal cameras, range- and distance-finding cameras (e.g., based on acoustics, laser, radar, and the like), stereo cameras, structured light cameras, ToF cameras, CCD-based cameras, CMOS-based cameras, machine vision systems, light curtains, multi- and hyper-spectral cameras, thermal cameras, and the like.

Additionally, as illustrated in FIG. 5, the plurality of sensor systems 502 includes a third sensor system 502c including a third set of one or more sensors. The third set of one or more sensors are configured to monitor the environment 504 and generate data associated with a reference parameter. In particular, the third sensor system 502c of FIG. 5 includes one or more environmental sensors configured to capture measurements associated with the environment 504 within which the system 500 is deployed. Although the third sensor system 502 is shown in FIG. 5 to be positioned above the water surface 506 to illustrate that environmental sensors are not required to be deployed below the water surface (e.g., in contrast to the illustration of FIG. 2), those skilled in the art will recognize that one or more of the environmental sensors of the third sensor system 502c may be deployed under the water surface, at the water surface, above the water surface, remote to the locale at which the fish 512 are located, remote to the processing system 510, or any combination of the above without departing from the scope of this disclosure.

As described in further detail below, in various embodiments, the environmental sensors of the third sensor system 502c generate environmental data that serves as reference data for implementing the dynamic weighting of various forecasts from a plurality of feeding appetite forecast models. For example, in one embodiment, the environmental sensors of the third sensor system 502c includes an ambient light sensor or other photodetector configured to sense or otherwise measure an amount of ambient light present within the environment local to the sensor. It should be recognized that although FIG. 5 is described in the specific context of an ambient light sensor, the third sensor system 502c may include any number of and any combination of various environmental sensors without departing from the scope of this disclosure.

The first sensor system 502a and the second sensor system 502b each generate a first feeding parameter data set 508a and a second feeding parameter data set 508b, respectively. In the context of FIG. 5, the first feeding parameter includes acoustic data. Such acoustic data may include any acoustics-related value or other measurable factor/characteristic that is representative of at least a portion of a data set that describes the presence (or absence), abundance, distribution, size, and/or behavior of underwater objects (e.g., a population of fish 512 as illustrated in FIG. 5). For example, the acoustic data may include acoustic measurements indicative of the relative and/or absolute locations of individual fish of the population of fish 512 within the environment 504. It should be recognized that although the first feeding parameter has been abstracted and described here generally as "acoustic data" for ease of description, those skilled in the art will understand that acoustic data (and therefore the first feeding parameter data set 508a corresponding to the acoustic data) may include, but is not limited to, any of a plurality of acoustics measurements, acoustic sensor specifications, operational parameters of acoustic sensors, and the like.

In the context of FIG. 5, the second feeding parameter includes image data. Such image data may include any image-related value or other measurable factor/characteristic that is representative of at least a portion of a data set that describes the presence (or absence), abundance, distribution, size, and/or behavior of objects (e.g., a population of fish 512 as illustrated in FIG. 5). For example, the image data may include camera images capturing measurements representative of the relative and/or absolute locations of individual fish of the population of fish 512 within the environment 504. The image data may also include camera images capturing measurements representative of the behavior of individual fish of the population of fish 512. It should be recognized that although the second feeding parameter has been abstracted and described here generally as "image data" for ease of description, those skilled in the art will understand that image data (and therefore the second feeding parameter data set 508b corresponding to the image data) may include, but is not limited to, any of a plurality of image frames, extrinsic parameters defining the location and orientation of the image sensors, intrinsic parameters that allow a mapping between camera coordinates and pixel coordinates in an image frame, camera models, operational parameters of the image sensors (e.g., shutter speed), depth maps, and the like.

Similarly, in the context of FIG. 5, the reference parameter includes environmental data. Such environmental data may include any measurement representative of the environment 504 within which the environmental sensors are deployed. For example, the environmental data (and therefore the reference parameter data set 508c corresponding to the environmental data) may include, but is not limited to, any of a plurality of ambient light measurements, water turbidity measurements, water temperature measurements, metocean measurements, satellite weather measurements, weather forecasts, air temperature, dissolved oxygen, current direction, current speeds, and the like.

In various embodiments, the processing system 510 receives one or more of the data sets 508 (e.g., first feeding parameter data set 508a, the second feeding parameter data set 508b, and the reference parameter data set 508c) via, for example, wired-telemetry, wireless-telemetry, or any other communications links for processing. The processing system 510 provides the first feeding parameter data set 508a to a first feeding appetite forecast model 522a. The processing system 510 also provides the second feeding parameter data set 508b to a second feeding appetite forecast model 522b different from the first feeding appetite forecast model 522a. In various embodiments, the first feeding appetite forecast model 522a receives the acoustic data of the first feeding parameter data set 508a as input and generates a first feeding appetite forecast 524a. By way of non-limiting example, in some embodiments, the first feeding appetite forecast model 522a utilizes acoustic data related to fish position within the water below the water surface 506 as a proxy for appetite (as appetite is a value which cannot be directly measured and must be inferred) in generating the first feeding appetite forecast 524a. In various embodiments, the first feeding appetite forecast 524a is a description of a possible hunger level expected to be exhibited by the population of fish 212 within the water for a future time period (i.e., a feeding appetite prediction).

The processing system 510 also provides the second feeding parameter data set 508b to a second feeding appetite forecast model 522b. In various embodiments, the second feeding appetite forecast model 522b receives the image data of the second feeding parameter data set 508b as input and generates a second feeding appetite forecast 524b. By way of non-limiting example, in some embodiments, the second feeding appetite forecast model 522b utilizes image data related to fish activity at the water surface 506 as an appetite proxy for generating the second feeding appetite forecast 224b. For example, the image data captured by the second set of sensors 502b may be analyzed to quantify or otherwise determine a level of surface level activity exhibited by the fish 512 (e.g., resulting from fish jumping out of the water as illustrated, rolling along the water surface 506, splashes at the water surface 506 caused by fish jumping, and the like) as an appetite proxy for generating the second feeding appetite forecast 224b. In various embodiments, the second feeding appetite forecast 524b is a description of a possible hunger level to be exhibited by the population of fish 512 within the water for a future time period (i.e., a feeding appetite prediction).

Subsequently, such as previously discussed in more detail with reference to FIGS. 3 and 4, the processing system 510 adaptively weights the first feeding appetite forecast 524a of the first feeding appetite forecast model 522a with a first weighting factor relative to a second weighting factor for a second feeding appetite forecast 524b of the second feeding appetite forecast model 522b in order to determine an aggregated appetite score 526 based on a combination of the first feeding appetite forecast model 522a using the first weight factor and the second feeding appetite forecast model 522b using the second weight factor.

Figure 6:
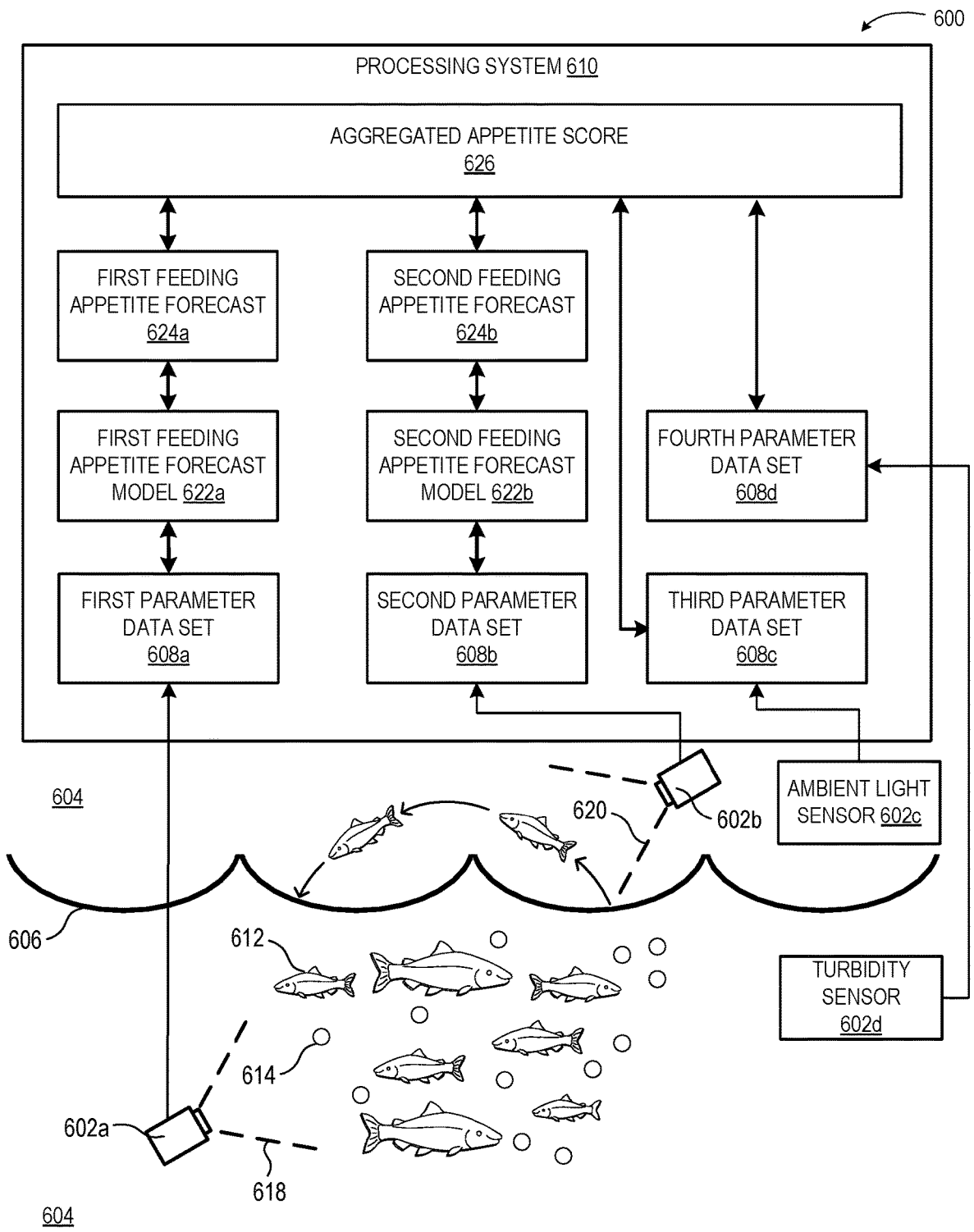
FIG. 6 is a diagram illustrating a forecast system implementing two sets of image-based sensors in accordance with some embodiments.

It should be recognized that although appetite forecasting and aggregated appetite scoring has been primarily discussed here in the context of sensors capturing different data types, any combination of sensors including multiple sensors capturing similar data may be employed for any of a variety of possible configurations without departing from the scope of this disclosure. For example, and now referring to FIG. 6, illustrated is a diagram showing a system 600 implementing two sets of image-based sensors in accordance with some embodiments. In various embodiments, the system 600 includes a plurality of sensor systems 602 that are each configured to monitor and generate data associated with the environment 604 within which they are placed.

As shown, the plurality of sensor systems 602 includes a first sensor system 602a positioned below the water surface 606 and including a first set of one or more sensors. The first set of one or more sensors are configured to monitor the environment 604 below the water surface 606 and generate data associated with a first feeding parameter. In particular, the first sensor system 602a of FIG. 6 includes one or more imaging sensors configured to observe fish behavior and capture measurements associated with feeding parameters related to fish appetite. In various embodiments, the imaging sensors are configured to capture image data corresponding to, for example, the presence (or absence), abundance, distribution, size, and behavior of underwater objects (e.g., a population of fish 612 as illustrated in FIG. 6). Such image data measurements may therefore be used to identify fish positions within the water for approximation of appetite. It should be recognized that although specific sensors are described below for illustrative purposes, various imaging sensors may be implemented in the systems described herein without departing from the scope of this disclosure.

In some embodiments, the imaging sensors of the first sensor system 602a includes one or more cameras configured to capture still images and/or record moving images (e.g., video data). The one or more cameras are directed towards the surrounding environment 604 below the water surface 606, with each camera capturing a sequence of images (e.g., video frames) of the environment 604 and any objects in the environment. In various embodiments, each camera has a different viewpoint or pose (i.e., location and orientation) with respect to the environment. Although FIG. 6 only shows a single camera for ease of illustration and description, persons of ordinary skill in the art having benefit of the present disclosure should appreciate that the first sensor system 602a can include any number of cameras and which may account for parameters such as each camera's horizontal field of view, vertical field of view, and the like. Further, persons of ordinary skill in the art having benefit of the present disclosure should appreciate that the first sensor system 602b can include any arrangement of cameras (e.g., cameras positioned on different planes relative to each other, single-plane arrangements, spherical configurations, and the like).

In various embodiments, the imaging sensors of the first sensor system 602a includes a first camera (or lens) having a particular field of view 618 as represented by the dashed lines that define the outer edges of the camera's field of view that images the environment 604 or at least a portion thereof. For the sake of clarity, only the field of view 618 for a single camera is illustrated in FIG. 6. In various embodiments, the imaging sensors of the first sensor system 602a includes at least a second camera having a different but overlapping field of view (not shown) relative to the first camera (or lens). Images from the two cameras therefore form a stereoscopic pair for providing a stereoscopic view of objects in the overlapping field of view. Further, it should be recognized that the overlapping field of view is not restricted to being shared between only two cameras. For example, at least a portion of the field of view 618 of the first camera of the first sensor system 602a may, in some embodiments, overlap with the fields of view of two other cameras to form an overlapping field of view with three different perspectives of the environment 604.

In some embodiments, the imaging sensors of the first sensor system 602a includes one or more light field cameras configured to capture light field data emanating from the surrounding environment 604. In other words, the one or more light field cameras captures data not only with respect to the intensity of light in a scene (e.g., the light field camera's field of view/perspective of the environment) but also the directions of light rays traveling in space. In contrast, conventional cameras generally record only light intensity data. In other embodiments, the imaging sensors of the first sensor system 602a includes one or more range imaging cameras (e.g., time-of-flight and LIDAR cameras) configured to determine distances between the camera and the subject for each pixel of captured images. For example, such range imaging cameras may include an illumination unit (e.g., some artificial light source) to illuminate the scene and an image sensor with each pixel measuring the amount of time light has taken to travel from the illumination unit to objects in the scene and then back to the image sensor of the range imaging camera.

It should be noted that the various operations are described here in the context of multi-camera or multi-lens cameras for ease of description and illustration. However, it should be recognized that the operations described herein may similarly be implemented with any type of imaging sensor without departing from the scope of this disclosure. For example, in various embodiments, the imaging sensors of the first sensor system 602a may include, but are not limited to, any of a number of types of optical cameras (e.g., RGB and infrared), thermal cameras, range- and distance-finding cameras (e.g., based on acoustics, laser, radar, and the like), stereo cameras, structured light cameras, ToF cameras, CCD-based cameras, CMOS-based cameras, machine vision systems, light curtains, multi- and hyperspectral cameras, thermal cameras, and the like.

Additionally, as illustrated in FIG. 6, the plurality of sensor systems 602 includes a second sensor system 602b positioned above the water surface 606 and including a second set of one or more sensors. The second set of one or more sensors are configured to monitor the environment 604 proximate to (e.g., at the water surface or even slightly underwater if the one or more sensors are capable of imaging) and above the water surface 606 and generate data associated with a second feeding parameter. In particular, the second sensor system 602b of FIG. 6 includes one or more imaging sensors configured to observe fish behavior and capture measurements associated with feeding parameters related to fish appetite. In various embodiments, the imaging sensors are configured to capture image data corresponding to, for example, the presence (or absence), abundance, distribution, size, and behavior of objects (e.g., a population of fish 612 as illustrated in FIG. 6). Such image data measurements may therefore be used to identify fish activity for approximation of appetite. It should be recognized that although specific sensors are described below for illustrative purposes, various imaging sensors may be implemented in the systems described herein without departing from the scope of this disclosure.

In some embodiments, the imaging sensors of the second sensor system 602b includes one or more cameras configured to capture still images and/or record moving images (e.g., video data). The one or more cameras are directed towards the environment proximate the water surface 606, with each camera capturing a sequence of images (e.g., video frames) of the environment 604 and any objects in the environment. In various embodiments, each camera has a different viewpoint or pose (i.e., location and orientation) with respect to the environment. Although FIG. 6 only shows a single camera for ease of illustration and description, persons of ordinary skill in the art having benefit of the present disclosure should appreciate that the second sensor system 602b can include any number of cameras and which may account for parameters such as each camera's horizontal field of view, vertical field of view, and the like. Further, persons of ordinary skill in the art having benefit of the present disclosure should appreciate that the second sensor system 602b can include any arrangement of cameras (e.g., cameras positioned on different planes relative to each other, single-plane arrangements, spherical configurations, and the like).

In various embodiments, the imaging sensors of the second sensor system 602b includes a first camera (or lens) having a particular field of view 620 as represented by the dashed lines that define the outer edges of the camera's field of view that images the environment 604 or at least a portion thereof. For the sake of clarity, only the field of view 620 for a single camera is illustrated in FIG. 6. In various embodiments, the imaging sensors of the second sensor system 602b includes at least a second camera (or lens) having a different but overlapping field of view (not shown) relative to the first camera (or lens). Images from the two cameras therefore form a stereoscopic pair for providing a stereoscopic view of objects in the overlapping field of view. Further, it should be recognized that the overlapping field of view is not restricted to being shared between only two cameras. For example, at least a portion of the field of view 620 of the first camera of the second sensor system 602b may, in some embodiments, overlap with the fields of view of two other cameras to form an overlapping field of view with three different perspectives of the environment 604.

In some embodiments, the imaging sensors of the second sensor system 602b includes one or more light field cameras configured to capture light field data emanating from the surrounding environment 604. In other words, the one or more light field cameras captures data not only with respect to the intensity of light in a scene (e.g., the light field camera's field of view/perspective of the environment) but also the directions of light rays traveling in space. In contrast, conventional cameras generally record only light intensity data. In other embodiments, the imaging sensors of the second sensor system 602b includes one or more range imaging cameras (e.g., time-of-flight and LIDAR cameras) configured to determine distances between the camera and the subject for each pixel of captured images. For example, such range imaging cameras may include an illumination unit (e.g., some artificial light source) to illuminate the scene and an image sensor with each pixel measuring the amount of time light has taken to travel from the illumination unit to objects in the scene and then back to the image sensor of the range imaging camera.

It should be noted that the various operations are described here in the context of multi-camera or multi-lens cameras for ease of description and illustration. However, it should be recognized that the operations described herein may similarly be implemented with any type of imaging sensor without departing from the scope of this disclosure. For example, in various embodiments, the imaging sensors of the second sensor system 602b may include, but are not limited to, any of a number of types of optical cameras (e.g., RGB and infrared), thermal cameras, range- and distance-finding cameras (e.g., based on acoustics, laser, radar, and the like), stereo cameras, structured light cameras, ToF cameras, CCD-based cameras, CMOS-based cameras, machine vision systems, light curtains, multi- and hyper-spectral cameras, thermal cameras, and the like.

Additionally, as illustrated in FIG. 6, the plurality of sensor systems 602 includes a third sensor system 602c including a third set of one or more sensors. As described in further detail below, in various embodiments, the environmental sensors of the third sensor system 602c generate environmental data that serves as reference data for implementing the dynamic weighting of various forecasts from a plurality of feeding appetite forecast models. For example, in one embodiment, the environmental sensors of the third sensor system 602c includes an ambient light sensor or other photodetector configured to sense or otherwise measure an amount of ambient light present within the environment local to the sensor. It should be recognized that although FIG. 6 is described in the specific context of an ambient light sensor, the third sensor system 602c may include any number of and any combination of various environmental sensors without departing from the scope of this disclosure.

Further, the plurality of sensor systems 602 includes a fourth sensor system 602d including a fourth set of one or more sensors. The fourth set of one or more sensors are configured to monitor the environment 604 below the water surface 606 and generate data associated with a reference parameter. As described in further detail below, in various embodiments, the environmental sensors of the fourth sensor system 602d generate environmental data that serves as reference data for implementing the dynamic weighting of various forecasts from a plurality of feeding appetite forecast models. For example, in one embodiment, the environmental sensors of the fourth sensor system 602d includes a turbidity sensor configured to measure an amount of light scattered by suspended solids in the water. In general, the more total suspended particulates or solids in water, the higher the turbidity and therefore murkier the water appears. It should be recognized that although FIG. 6 is described in the specific context of a turbidity sensor, the fourth sensor system 602d may include any number of and any combination of various environmental sensors without departing from the scope of this disclosure.

The first sensor system 602a and the second sensor system 602b each generate a first feeding parameter data set 608a and a second feeding parameter data set 608b, respectively. In the context of FIG. 6, the first feeding parameter includes image data captured from below the water surface 606 and the second feeding parameter includes image data captured with respect to the water surface 606 or from above the water surface 606. Such image data may include any image-related value or other measurable factor/characteristic that is representative of at least a portion of a data set that describes the presence (or absence), abundance, distribution, size, and/or behavior of objects (e.g., a population of fish 612 as illustrated in FIG. 6).

For example, in various embodiments, the image data of the first and second feeding parameter data sets 608a, 608b includes camera images capturing measurements representative of the relative and/or absolute locations of individual fish of the population of fish 612 within the environment 604. The image data may also include camera images capturing measurements representative of the behavior of individual fish of the population of fish 612. It should be recognized that although the first feeding parameter and the second feeding parameter has been abstracted and described here generally as "image data" for ease of description, those skilled in the art will understand that image data (and therefore the first feeding parameter data set 608a and the second feeding parameter data set 608b corresponding to the image data) may include, but is not limited to, any of a plurality of image frames, extrinsic parameters defining the location and orientation of the image sensors, intrinsic parameters that allow a mapping between camera coordinates and pixel coordinates in an image frame, camera models, operational parameters of the image sensors (e.g., shutter speed), depth maps, and the like.

Similarly, in the context of FIG. 6, the reference parameter includes environmental data. Such environmental data may include any measurement representative of the environment 604 within which the environmental sensors are deployed. For example, the environmental data (and therefore the first reference parameter data set 608c and the second reference parameter data set 608d corresponding to the environmental data) may include, but is not limited to, any of a plurality of ambient light measurements, water turbidity measurements, water temperature measurements, metocean measurements, satellite weather measurements, weather forecasts, air temperature, dissolved oxygen, current direction, current speeds, and the like.

In various embodiments, the processing system 610 receives one or more of the data sets 608 (e.g., first feeding parameter data set 608a, the second feeding parameter data set 608b, the first reference parameter data set 608c, and the second reference parameter data set 608d) via, for example, wired-telemetry, wireless-telemetry, or any other communications links for processing. The processing system 610 provides the first feeding parameter data set 608a to a first feeding appetite forecast model 622a. The processing system 610 also provides the second feeding parameter data set 608b to a second feeding appetite forecast model 622b different from the first feeding appetite forecast model 622a. In various embodiments, the first feeding appetite forecast model 622a receives the image data of the first feeding parameter data set 608a as input and generates a first feeding appetite forecast 624a. By way of non-limiting example, in some embodiments, the first feeding appetite forecast model 622a utilizes image data related to fish position within the water below the water surface 606 as a proxy for appetite (as appetite is a value which cannot be directly measured and must be inferred) in generating the first feeding appetite forecast 624a. In various embodiments, the first feeding appetite forecast 624a is a description of a possible hunger level expected to be exhibited by the population of fish 612 within the water for a future time period (i.e., a feeding appetite prediction).

The processing system 610 also provides the second feeding parameter data set 608b to a second feeding appetite forecast model 622b. In various embodiments, the second feeding appetite forecast model 622b receives the image data of the second feeding parameter data set 608b as input and generates a second feeding appetite forecast 624b. By way of non-limiting example, in some embodiments, the second feeding appetite forecast model 622b utilizes image data related to fish activity at the water surface 606 as an appetite proxy for generating the second feeding appetite forecast 624b. For example, the image data captured by the second set of sensors 602b may be analyzed to quantify or otherwise determine a level of surface level activity exhibited by the fish 612 (e.g., resulting from fish jumping out of the water as illustrated, rolling along the water surface 606, splashes at the water surface 606c caused by jumping, and the like) as an appetite proxy for generating the second feeding appetite forecast 224b. In various embodiments, the second feeding appetite forecast 624b is a description of a possible hunger level to be exhibited by the population of fish 612 within the water for a future time period (i.e., a feeding appetite prediction).

Subsequently, such as previously discussed in more detail with reference to FIGS. 3 and 4, the processing system 610 adaptively weights the first feeding appetite forecast 624a of the first feeding appetite forecast model 622a with a first weighting factor relative to a second weighting factor for a second feeding appetite forecast 624b of the second feeding appetite forecast model 622b in order to determine an aggregated appetite score 626 based on a combination of the first feeding appetite forecast model 622a using the first weight factor and the second feeding appetite forecast model 622b using the second weight factor. For example, in one embodiment, the processing system 610 may preferentially weight the second feeding appetite forecast model 622b (i.e., model based on surface camera images) relative to the first feeding appetite forecast model 622a (i.e., model based on sub-surface camera images) when environmental conditions are indicated by the reference sensors 602c, 602d to include turbid waters but sunny weather at noon. Similarly, the processing system 610 may preferentially underweight the second feeding appetite forecast model 622b (i.e., model based on surface camera images) relative to the first feeding appetite forecast model 622a (i.e., model based on sub-surface camera images) when environmental conditions are indicated by the reference sensors 602c, 602d to include clear waters but foggy weather conditions such that the surface cameras of the second sensor system 602b will be less reliable.

Figure 7:
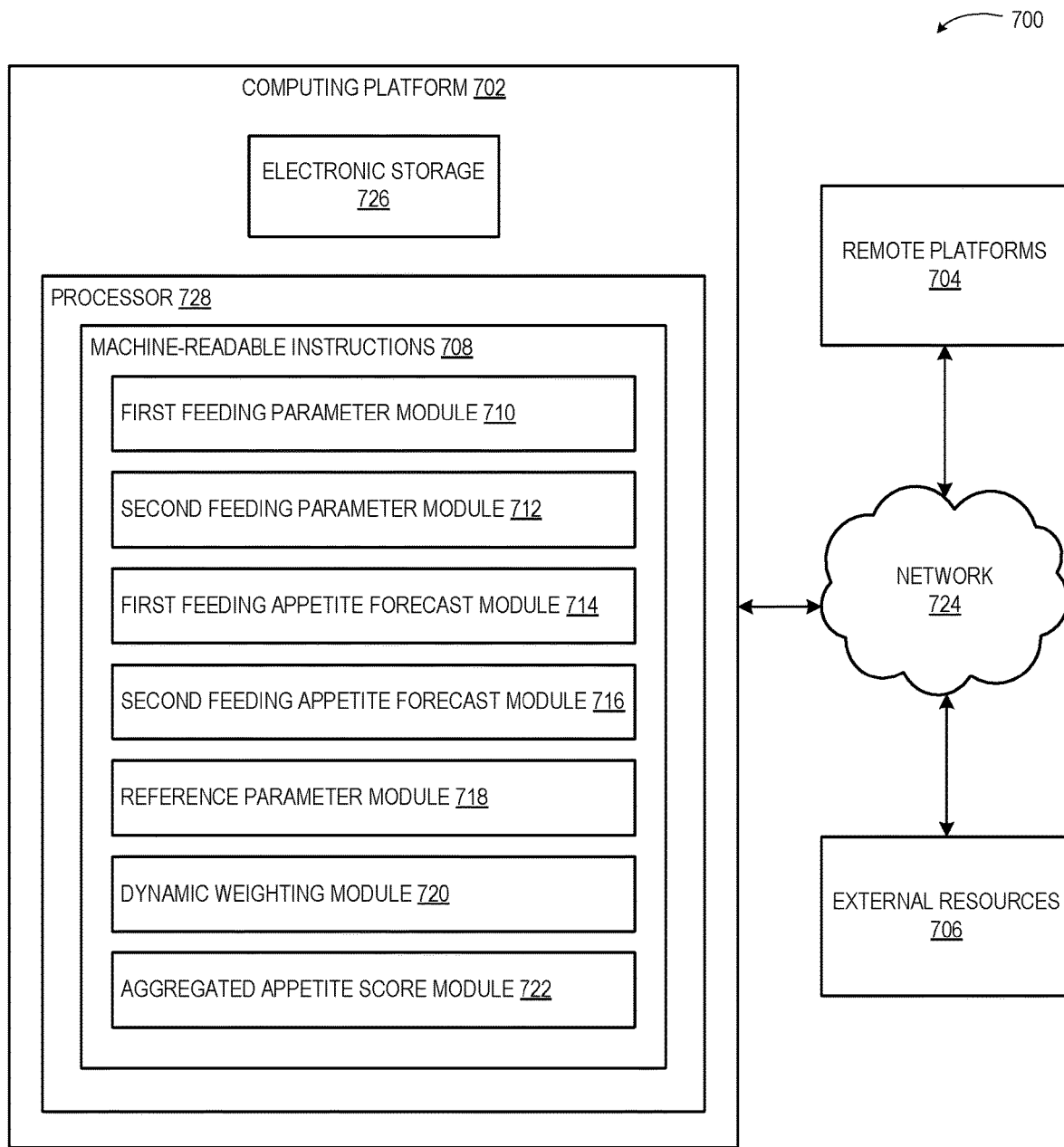
FIG. 7 is a block diagram illustrating a system configured to provide a feeding appetite forecast in accordance with some embodiments.

FIG. 7 is a block diagram illustrating a system 700 configured to provide a feeding appetite forecast in accordance with some embodiments. In some embodiments, the system 700 includes one or more computing platforms 702. The computing platform(s) 702 may be configured to communicate with one or more remote platforms 704 according to a client/server architecture, a peer-to-peer architecture, and/or other architectures via a network 724. Remote platform(s) 704 may be configured to communicate with other remote platforms via computing platform(s) 702 and/or according to a client/server architecture, a peer-to-peer architecture, and/or other architectures via the network 724. Users may access system 700 via remote platform(s) 704. A given remote platform 704 may include one or more processors configured to execute computer program modules. The computer program modules may be configured to enable an expert or user associated with the given remote platform 704 to interface with system 700 and/or one or more external resource(s) 706, and/or provide other functionality attributed herein to remote platform(s) 704. By way of non-limiting example, a given remote platform 704 and/or a given computing platform 702 may include one or more of a server, a desktop computer, a laptop computer, a handheld computer, a tablet computing platform, a NetBook, a Smartphone, a gaming console, and/or other computing platforms.

In some implementations, the computing platform(s) 702, remote platform(s) 704, and/or one or more external resource(s) 706 may be operatively linked via one or more electronic communication links. For example, such electronic communication links may be established, at least in part, via a network 724 such as the Internet and/or other networks. It will be appreciated that this is not intended to be limiting, and that the scope of this disclosure includes implementations in which computing platform(s) 702, remote platform(s) 704, and/or one or more external resource(s) 706 may be operatively linked via some other communication media. External resource(s) 706 may include sources of information outside of system 700, external entities participating with system 700, and/or other resources. In some implementations, some or all of the functionality attributed herein to external resources 706 may be provided by resources included in system 700.

In various embodiments, the computing platform(s) 702 are configured by machine-readable instructions 708 including one or more instruction modules. In some embodiments, the instruction modules include computer program modules for implementing the various operations discussed herein (such as the operations previously discussed with respect to FIG. 4). For purposes of reference, the instruction modules include one or more of a first feeding parameter module 710, a second feeding parameter module 712, a first feeding appetite forecast module 714, a second feeding appetite forecast module 716, a reference parameter module 718, a dynamic weighting module 720, and an aggregated appetite score module 722. Each of these modules may be implemented as one or more separate software programs, or one or more of these modules may be implemented in the same software program or set of software programs. Moreover, while referenced as separate modules based on their overall functionality, it will be appreciated that the functionality ascribed to any given model may be distributed over more than one software program. For example, one software program may handle a subset of the functionality of the first feeding parameter module 710 while another software program handles another subset of the functionality of the first feeding parameter module 710 and the functionality of the first feeding appetite forecast module 714.

In various embodiments, the first feeding parameter module 710 generally represents executable instructions configured to receive a first feeding parameter data set associated with a first feeding parameter. With reference to FIGS. 1-6 and 8, in various embodiments, the first feeding parameter module 710 receives sensor data including the first feeding parameter data set via a wireless or wired communications link for storage, further processing, and/or distribution to other modules of the system 700. For example, in the context of FIGS. 2 and 5, the sensor systems 202, 502 communicate at least the first parameter data sets 208a, 508a including acoustic data corresponding to the presence (or absence), abundance, distribution, size, and behavior of underwater objects (e.g., a population of fish and feed). In the context of FIG. 6, the sensor system 602 communicates at least a first parameter data set 608a including under water image data corresponding to the presence (or absence), abundance, distribution, size, and behavior of underwater objects (e.g., a population of fish and feed). In various embodiments, such first parameter data sets may be processed by the first feeding parameter module 710 to format or package the data set for use by, for example, feeding appetite forecast models.

In various embodiments, the second feeding parameter module 712 generally represents executable instructions configured to receive a second feeding parameter data set associated with a second feeding parameter. With reference to FIGS. 1-6 and 8, in various embodiments, the second feeding parameter module 712 receives sensor data including the second feeding parameter data set via a wireless or wired communications link for storage, further processing, and/or distribution to other modules of the system 700. For example, in the context of FIG. 2, the sensor system 202 communicates at least the second parameter data set 208b including under water image data corresponding to for example, the presence (or absence), abundance, distribution, size, and behavior of underwater objects. In the context of FIGS. 5 and 6, the sensor systems 502, 602 communicate at least the second parameter data sets 508b, 608b including image data from the water surface or above the water surface corresponding to for example, the presence (or absence), abundance, distribution, size, and behavior of objects (e.g., a population of fish 512 as illustrated in FIG. 5).

In various embodiments, the first feeding appetite forecast module 714 generally represents executable instructions configured to receive the first feeding parameter data set from the first feeding parameter module 710 and generate a feeding appetite forecast. With reference to FIGS. 1-6 and 8, in various embodiments, the first feeding appetite forecast module 714 receives one or more data sets embodying parameters related to appetite, including factors that directly influence appetite, factors that may influence the accuracy of feeding appetite models, and the like. For example, in the context of FIGS. 2 and 5, the first feeding parameter module 710 receives at least the first parameter data sets 208a, 508a including acoustic data corresponding to the presence (or absence), abundance, distribution, size, and behavior of underwater objects (e.g., a population of fish and feed). In the context of FIG. 6, the first feeding parameter module 710 receives at least a first parameter data set 608a including under water image data corresponding to the presence (or absence), abundance, distribution, size, and behavior of underwater objects (e.g., a population of fish and feed). In various embodiments, the first feeding appetite forecast module 714 utilizes one or more learned models (not shown) to generate a first feeding appetite forecast representing a possible hunger level that is to be expected for a future time period (i.e., a feeding appetite prediction), as it is influenced by the feeding parameters of the first parameter data set.

In various embodiments, additional inputs such as the results of feeding according to the forecasted appetite may be incorporated into the learned model so that the learned model evolves to facilitate the subsequent performance of similar feeding appetite forecasting. In various embodiments, the learned model includes a system represented by one or more data structures, executable instructions, or combinations thereof, that is trained and having an internal representation modified or adapted based in input or experience during the training process. One example of the learned model is a neural network. Other implementations include parametric representations, such as coefficients for dynamics models, latent or explicit embedding into metric spaces for methods like nearest neighbors, or the like.

In some embodiments, the learned model of the first feeding appetite forecast module 714 is initialized through a supervised learning process so as to obtain a baseline set of knowledge regarding the operational environment and the performance of at least certain feeding appetite forecasts by the first feeding appetite forecast module 714. In other embodiments, the learned model may be initiated at a particular processing system (e.g., computing platform 702) by, for example, populating the learned model with the knowledge of a learned model of other similar appetite forecast models, forecast models optimized for different locales, or a "default knowledge core" maintained by the computing platform 702 for distribution to each feeding appetite forecast as additional sensor systems and/or parameter data sets are integrated into the systems or otherwise become available to storage and processing.

In various embodiments, the second feeding appetite forecast module 716 generally represents executable instructions configured to receive the second feeding parameter data set from the second feeding parameter module 712 and generate a feeding appetite forecast. With reference to FIGS.

1-6 and 8, in various embodiments, the second feeding appetite forecast module 716 receives one or more data sets embodying parameters related to appetite, including factors that directly influence appetite, factors that may influence the accuracy of feeding appetite models, and the like. For example, in the context of FIG. 2, the second feeding appetite forecast module 716 receives at least the second parameter data set 208b including under water image data corresponding to for example, the presence (or absence), abundance, distribution, size, and behavior of underwater objects. In the context of FIGS. 5 and 6, the second feeding appetite forecast module 716 receives at least the second parameter data sets 508b, 608b including image data from the water surface or above the water surface corresponding to for example, the presence (or absence), abundance, distribution, size, and behavior of objects (e.g., a population of fish 512 as illustrated in FIG. 5). In various embodiments, the second feeding appetite forecast module 716 utilizes one or more learned models (not shown) to generate a second feeding appetite forecast representing a possible hunger level that is to be expected for a future time period (i.e., a feeding appetite prediction), as it is influenced by the feeding parameters of the second parameter data set.

In various embodiments, additional inputs such as the results of feeding according to the forecasted appetite may be incorporated into the learned model so that the learned model evolves to facilitate the subsequent performance of similar feeding appetite forecasting. In various embodiments, the learned model includes a system represented by one or more data structures, executable instructions, or combinations thereof, that is trained and having an internal representation modified or adapted based in input or experience during the training process. One example of the learned model is a neural network. Other implementations include parametric representations, such as coefficients for dynamics models, latent or explicit embedding into metric spaces for methods like nearest neighbors, or the like.

In some embodiments, the learned model of the second feeding appetite forecast module 716 is initialized through a supervised learning process so as to obtain a baseline set of knowledge regarding the operational environment and the performance of at least certain feeding appetite forecasts by the second feeding appetite forecast module 716. In other embodiments, the learned model may be initiated at a particular processing system (e.g., computing platform 702) by, for example, populating the learned model with the knowledge of a learned model of other similar appetite forecast models, forecast models optimized for different locales, or a "default knowledge core" maintained by the computing platform 702 for distribution to each feeding appetite forecast as additional sensor systems and/or parameter data sets are integrated into the systems or otherwise become available to storage and processing.

In various embodiments, the reference parameter module 718 generally represents executable instructions configured to receive one or more feeding parameter data set associated with a feeding parameter. With reference to FIGS. 1-6 and 8, in various embodiments, the reference parameter module 718 receives sensor data including at least one reference parameter data set via a wireless or wired communications link for storage, further processing, and/or distribution to other modules of the system 700. For example, in the context of FIGS. 2 and 6, the sensor systems 202, 602 communicate at least the reference parameter data sets 208c, 608d including water turbidity measurements to the processing systems 210, 610, respectively. In the context of FIGS. 5 and 6, the sensor systems 502, 602 communicate at least the reference parameter data sets 508c, 608c including ambient light measurements to the processing systems 510, 610, respectively.

In various embodiments, the dynamic weighting module 720 generally represents executable instructions configured to adaptively weight a first feeding appetite forecast (such as the forecast generated by first feeding appetite forecast module 714) relative to a second feeding appetite forecast (such as the forecast generated by second feeding appetite forecast module 716). With reference to FIGS. 1-6 and 8, in various embodiments, the dynamic weighting module 720 receives reference data such as the reference parameter data sets from the reference parameter module 718 and compares, for example, environmental conditions as represented by the reference parameter data sets to determine the relative accuracy amongst a plurality of appetite forecasting models under such environmental conditions. For example, in the context of FIGS. 2 and 3, the processing system 210 assigns a relative weighting with the first weighting factor $w_1$ of 0.4 for the first feeding appetite forecast model (based on acoustic data) and the second weighting factor $w_2$ of 0.6 for the second feeding appetite forecast model (based on image data) due to a first set of environmental conditions (e.g., using environmental data from the environmental sensors to measure conditions for a current time or to forecast for a future time period) in which the weather is sunny, waters are clean, but waves are choppy. However, the processing system 210 assigns a relative weighting with the first weighting factor $w_1$ of 0.9 for the first feeding appetite forecast model (based on acoustic data) and the second weighting factor $w_2$ of 0.1 for the second feeding appetite forecast model (based on image data) due to the second set of environmental conditions and discounts the image-based, second feeding appetite forecast model that is expected to be less accurate in murky waters.

In various embodiments, the aggregated appetite score module 722 generally represents executable instructions configured to determine an aggregated appetite score based on a combination of the first feeding appetite forecast model using the first weight factor and the second feeding appetite forecast model using the second weight factor. With reference to FIGS. 1-6 and 8, in various embodiments, the aggregated appetite score module 722 receives at least the first appetite forecast generated by the first feeding appetite forecast module 714, the second appetite forecast generated by the second feeding appetite forecast module 716, and the weighting factors assigned by the dynamic weighting module 720. In some embodiments, such as discussed in the context of FIGS. 2, 3 and 8, the aggregated appetite score module 722 normalizes a plurality of appetite forecasts (e.g., feeding appetite forecasts 224a, 224b as represented by model scores 302a-312N in FIGS. 2-3) and/or appetite-related descriptors (e.g., appetite descriptors 802a-802e of FIG. 8) into a common unit scale.

Subsequently, the aggregated appetite score module 722 applies, in the context of FIGS. 2-3, the assigned weighting factors $w_1$, $w_2$ to the first normalized model score 304a and the second normalized model score 304b, respectively, to generate a first weighted model score 306a of 32 and a second weighted model score 306b of 51. Further, the aggregated appetite score module 722 combines these two weighted model scores 306a, 306b to generate a weighted, aggregated appetite score 308 of 83 and thereby integrates data from multi-sensor systems to provide an appetite forecast. In some embodiments, such as in the context of FIG. 8, the aggregated appetite score module 722 also generates a feeding instruction signal 810 based on the aggregated appetite score that instructs a user and/or automated feeding system regarding specific actions to be taken in accordance to the feeding appetite prediction.

The system 700 also includes an electronic storage 726 including non-transitory storage media that electronically stores information. The electronic storage media of electronic storage 726 may include one or both of system storage that is provided integrally (i.e., substantially non-removable) with computing platform(s) 702 and/or removable storage that is removably connectable to computing platform(s) 702 via, for example, a port (e.g., a USB port, a firewire port, etc.) or a drive (e.g., a disk drive, etc.). Electronic storage 726 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 726 may include one or more virtual storage resources (e.g., cloud storage, a virtual private network, and/or other virtual storage resources). Electronic storage 726 may store software algorithms, information determined by processor(s) 728, information received from computing platform(s) 702, information received from remote platform(s) 704, and/or other information that enables computing platform(s) 702 to function as described herein.

Processor(s) 728 may be configured to provide information processing capabilities in computing platform(s) 702. As such, processor(s) 728 may include one or more of a digital processor, an analog processor, a digital circuit designed to process information, an analog circuit designed to process information, a state machine, and/or other mechanisms for electronically processing information. Although processor(s) 728 is shown in FIG. 7 as a single entity, this is for illustrative purposes only. In some implementations, processor(s) 728 may include a plurality of processing units. These processing units may be physically located within the same device, or processor(s) 728 may represent processing functionality of a plurality of devices operating in coordination. Processor(s) 728 may be configured to execute modules 710, 712, 714, 716, 718, 720, and/or 722, and/or other modules. Processor(s) 728 may be configured to execute modules 710, 712, 714, 716, 718, 720, and/or 722, and/or other modules by software; hardware; firmware; some combination of software, hardware, and/or firmware; and/or other mechanisms for configuring processing capabilities on processor(s) 728. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 710, 712, 714, 716, 718, 720, and/or 722 are illustrated in FIG. 7 as being implemented within a single processing unit, in implementations in which processor(s) 728 includes multiple processing units, one or more of modules 710, 712, 714, 716, 718, 720, and/or 722 may be implemented remotely from the other modules. The description of the functionality provided by the different modules 710, 712, 714, 716, 718, 720, and/or 722 described below is for illustrative purposes, and is not intended to be limiting, as any of modules 710, 712, 714, 716, 718, 720, and/or 722 may provide more or less functionality than is described. For example, one or more of modules 710, 712, 714, 716, 718, 720, and/or 722 may be eliminated, and some or all of its functionality may be provided by other ones of modules 710, 712, 714, 716, 718, 720, and/or 722. As another example, processor(s) 728 may be configured to execute one or more additional modules that may perform some or all of the functionality attributed below to one of modules 710, 712, 714, 716, 718, 720, and/or 722.

Referring now to FIG. 8, illustrated is another example diagram 800 of adaptive weighting of feeding appetite forecasts in accordance with some embodiments. As illustrated, a plurality of feeding appetite forecasts 802 (which may be model-based outputs or otherwise) include a first feeding appetite descriptor 802a, a second feeding appetite descriptor 802b, a third feeding appetite descriptor 802c, a fourth feeding appetite descriptor 802d, and a fifth feeding appetite descriptor 802e.

The first feeding appetite descriptor 802a, as represented by the number 2, corresponds to a quantification of a number of feed pellets that has been administered to a population of fish but has fallen past the fish biomass or otherwise gone uneaten. In various embodiments, the first feeding appetite descriptor 802a may be determined based on, for example, data measured by any of the sensor systems discussed herein, such as acoustics-data based sensor system 202a of FIG. 2 or by human-vision-perception from a video image stream captured by the image-data based sensor system 202b of FIG. 2. The low raw number of uneaten feed pellets of the first feeding appetite descriptor 802a is indicative of a relatively high level of hunger, as the majority of administered feed is being eaten. In contrast, a high raw number of uneaten feed pellets for the first feeding appetite descriptor 802a may be indicative that the fish have reached satiation and have therefore stopped eating. Similarly, a low but gradually increasing number of uneaten pellets may be indicative that the fish are beginning to reach satiation.

The second feeding appetite descriptor 802b, as represented by the number 9, corresponds to a human-provided value on an integer scale of 0-10. In various embodiments, the second feeding appetite descriptor 802b may be determined via human visual perception and based on feeder personal experience. For example, in some embodiments, the numerical value 9 may represent that the feeder is able to visually identify a number of fish swimming near the water surface and/or actively jumping out of the water, behaviors which are indicative of increased hunger levels. The third feeding appetite descriptor 802c, as represented by the color green, corresponds to a color-coded descriptor of hunger in a red, yellow, and green coloring scheme in which green is indicative of increased hunger levels.

The fourth feeding appetite descriptor 802d, as represented by the percentage value 80%, corresponds to a percentage quantification of total biomass positioned at a location within the water that is indicative of hunger. As a hypothetical example, in some embodiments, a predetermined threshold is set such that biomass being located within an upper (i.e., closer to water surface) ⅓ of the volumetric enclosure within which the fish are located is indicative of increased hunger levels. The fifth feeding appetite descriptor 802e, as represented by the value 0.4, corresponds to feeding rate instructions as it relates to pellets per fish individual per minute (PPFPM). In various embodiments, this 0.4 PPFPM value is indicative of a level of appetite at which fish are hungry but not ravenous such that increasing the feed rate any further would result in waste of feed pellets.

As is evident, each of the plurality of feeding appetite forecasts 802 is a descriptor that is related in appetite in some manner. However, it will be appreciated that the descriptors and values associated with the plurality of feeding appetite forecasts 802 do not share a common baseline for comparison. Accordingly, in various embodiments, the systems described herein (e.g., systems 100-700 of FIGS. 1-7) normalizes each of the plurality of feeding appetite forecasts 802 based on a comparison to a corresponding baseline or predetermined threshold, respectively, to generate a normalized model score 804. That is, the systems are configured to normalize each of the feeding appetite forecasts to a common score scale based on their respective comparisons relative to some established parameter, threshold, expected baseline, and the like on which the individual appetite descriptors are based.

For example, with respect to the first feeding appetite forecast, the systems described herein normalize the first appetite descriptor 802a based on a comparison to historical feed pellet counts with respect to biomass location to generate a first normalized model score 804a of 75 based on an example one hundred point scale. Similarly, with respect to the second feeding appetite forecast, the systems normalize the second appetite descriptor 802b based on a comparison of the human-provided value of 9 to the integer scale of 0-10 on which it is based for conversion to the same one hundred point scale and generate a second normalized model score 804b of 90.

With respect to the third feeding appetite forecast, the systems normalize the third appetite descriptor 802c of the green color based on a comparison to a color-coded descriptor of hunger in a red, yellow, and green coloring scheme in which green is indicative of increased hunger levels to generate a third normalized model score 804c of 70 in the one hundred point common scale. With respect to the fourth feeding appetite forecast, the systems normalize the fourth appetite descriptor 802d of the percentage 80% based on a comparison relative to an expected base behavior (i.e., expected portion of total biomass that is expected to be located within, for illustrative purposes, an upper ⅓ of the volumetric enclosure within which the fish are located is indicative of increased hunger levels). In this illustrative example, 80% of biomass being above the threshold level generates a fourth normalized model score 804d of 55 in the one hundred point common scale. Lastly, with respect to the fifth feeding appetite forecast, the systems normalize the fifth appetite descriptor 802e of 0.4 PPFPM based on a comparison to historical feed rates to generate a fifth normalized model score 804e of 50 in the one hundred point common scale.

It should be recognized that the above-mentioned bases for normalization of disparate appetite descriptors having different individual underlying scales (and also the one hundred point normalization scale) are provided only for simplified illustrative purposes only. In various embodiments, the systems described herein may utilize any appropriate basis for conversion of the different appetite descriptors 802a-802e to a common normalization scale as will be understood by those skilled in the art.

The systems will adaptively weight the first through fifth feeding appetite models and their associated appetite descriptors/normalized score values in a manner similar to that previously discussed in more detail relative to FIGS. 1-7. For ease of illustration, the weighting has been shown in FIG. 8 to be equal weighted such that the systems assign a first weighting factor $w_1$ of 0.2 to the first feeding appetite forecast model, a second weighting factor $w_2$ of 0.2 to the second feeding appetite forecast model, a third weighting factor $w_3$ of 0.2 to the third feeding appetite forecast model, a fourth weighting factor $w_4$ of 0.2 to the fourth feeding appetite forecast model, and a fifth weighting factor $w_5$ of 0.2 to the fifth feeding appetite forecast model. Subsequently, the systems applies the assigned weighting factors $w_1$-$w_5$ to the first through fifth normalized model scores 804a-804e, respectively to generate a first weighted model score 806a of 15, a second weighted model score 806b of 18, a third weighted model score 806c of 14, a fourth weighted model score 806d of 11, and a fifth weighted model score 806e of 10. Further, the system combines these five weighted model scores 806a-806e to generate a weighted, aggregated appetite score 808 of 68 and thereby integrates data from multi-sensor systems to provide an appetite forecast score.

In various embodiments, the aggregated appetite score 808 may be displayed in a graphical user interface for presentation to a user. For example, a value of 68 (within a 100 point scale) for the aggregated appetite score 808 provides context regarding expected appetite levels, and the user may take action accordingly. In other embodiments, the systems may optionally generate a feeding instruction signal 810 (as represented by the dotted line box) that instructs a user and/or automated feeding system regarding specific actions to be taken in accordance to the feeding appetite prediction (e.g., as quantified by the aggregated appetite score 808). Similar to the first through fifth feeding appetite forecasts discussed here with respect to FIG. 8, it will be appreciated that the feeding instruction signal 810 is not limited to any particular format and in various embodiments may, in a manner similar to a reversing of the previous normalization operations, be converted to any appropriate format. Such formats for the feeding instruction signal 810 include, by way of non-limiting example, a stop signal, a color-coded user interface display, a specific feed rate that should be administered, a total feed volume that should be administered, and the like.

Although primarily discussed here in the context of aquaculture as it relates to the feeding of fish, those skilled in the art will recognize that the techniques described herein may be applied to any aquatic, aquaculture species such as shellfish, crustaceans, bivalves, and the like without departing from the scope of this disclosure. Further, those skilled in the art will recognize that the techniques described herein may also be applied to adaptively weighting feeding models and providing aggregated appetite forecasting for any husbandry animal that is reared in an environment in which multiple different sensor systems are applied, and for which the sensor systems will vary in accuracy of appetite prediction depending on environmental conditions, differing availability of data over time, differing data granularities, and the like.

Additionally, although primarily illustrated and discussed here in the context of fish being positioned in an open water environment (which will also include an enclosure of some kind to prevent escape of fish into the open ocean), those skilled in the art will recognize that the techniques described herein may similarly be applied to any type of aquatic farming environment. For example, such aquatic farming environments may include, by way of non-limiting example, lakes, ponds, open seas, recirculation aquaculture systems (RAS) to provide for closed systems, raceways, indoor tanks, outdoor tanks, and the like.

Accordingly, as discussed herein, FIGS. 1-8 describe techniques that improve the precision and accuracy of feeding appetite forecasting and decreasing the uncertainties associated with conventional appetite prediction systems by adaptively weighting different feeding appetite predictions from different feeding appetite forecast models and combining them into an aggregated appetite score that is more accurate than would be individually provided by each feeding appetite forecast model by itself. Further, the techniques described here provide an efficient manner for farmers to integrate the ever increasing suite of available sensor technologies in the future with any sensors currently utilized at their farming sites to improve feeding and the results of aquaculture operations.

In some embodiments, certain aspects of the techniques described above may implemented by one or more processors of a processing system executing software. The software includes one or more sets of executable instructions stored or otherwise tangibly embodied on a non-transitory computer readable storage medium. A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method for providing a feeding appetite forecast, the method comprising:
   providing a first feeding parameter data set associated with a first feeding parameter to a first feeding appetite forecast model;
   providing a second feeding parameter data set associated with a second feeding parameter to a second feeding appetite forecast model different from the first forecast model;
   adaptively weighting the first feeding appetite forecast model with a first weighting factor relative to a second weighting factor for the second feeding appetite forecast model;
   determining an aggregated appetite score based on a combination of the first feeding appetite forecast model using the first weight factor and the second feeding appetite forecast model using the second weight factor; and
   providing a feeding instruction signal based at least in part on the aggregated appetite score for modifying operations of a feed control system.

2. The method of claim 1, wherein adaptively weighting the first feeding appetite forecast model with the first weighting factor relative to the second weighting factor for the second feeding appetite forecast model further comprises:
   providing a measured reference data related to the first feeding parameter and the second feeding parameter;
   assigning the first weight factor to the first feeding appetite forecast model based on a comparison of the first forecast parameter data set with the measured reference data; and
   assigning the second weight factor to the second feeding appetite forecast model based on a comparison of the second feeding parameter data set with the measured reference data.

3. The method of claim 2, further comprising:
   providing an actual amount of feed given for a prior time period;
   assigning the first weight factor based on a comparison of a first predicted feed amount provided by the first feeding appetite forecast model relative to the actual amount of feed given for the prior time period; and
   assigning the second weight factor based on a comparison of a second predicted feed amount provided by the second feeding appetite forecast model relative to the actual amount of feed given for the prior time period.

4. The method of claim 2, further comprising:
   providing a feed table amount of feed calculated to be given for a prior time period;
   assigning the first weight factor based on a comparison of a first predicted feed amount provided by the first feeding appetite forecast model relative to the feed table amount of feed calculated for the prior time period; and assigning the second weight factor based on a comparison of a second predicted feed amount provided by the second feeding appetite forecast model relative to the feed table amount of feed calculated for the prior time period.

5. The method of claim 1, further comprising:

adaptively re-weighting, based at least in part on a weather forecast for a future time period, the first feeding appetite forecast model relative to the second feeding appetite forecast model.

6. The method of claim 5, further comprising:

preferentially weighting, based at least in part on a first environmental parameter of the weather forecast exceeding a predetermined threshold for the future time period, the first feeding appetite forecast model relative to the second feeding appetite forecast model.

7. The method of claim 5, further comprising:

preferentially weighting, based at least in part on a second environmental parameter of the weather forecast exceeding a predetermined threshold for the future time period, the second feeding appetite forecast model relative to the first feeding appetite forecast model.

8. A non-transitory computer readable medium embodying a set of executable instructions, the set of executable instructions to manipulate at least one processor to:

provide a first feeding parameter data set associated with a first feeding parameter to a first feeding appetite forecast model;

provide a second feeding parameter data set associated with a second feeding parameter to a second feeding appetite forecast model different from the first forecast model;

adaptively weight the first feeding appetite forecast model with a first weighting factor relative to a second weighting factor for the second feeding appetite forecast model;

determine an aggregated appetite score based on a combination of the first feeding appetite forecast model using the first weight factor and the second feeding appetite forecast model using the second weight factor; and provide a feeding instruction signal generated based at least in part on the aggregated appetite score for modifying operations of a feed control system.

9. The non-transitory computer readable medium of claim 8, further embodying executable instructions to manipulate at least one processor to:

provide a measured reference data related to the first feeding parameter and the second feeding parameter;

assign the first weight factor to the first feeding appetite forecast model based on a comparison of the first forecast parameter data set with the measured reference data; and assign the second weight factor to the second feeding appetite forecast model based on a comparison of the second feeding parameter data set with the measured reference data.

10. The non-transitory computer readable medium of claim 9, further embodying executable instructions to manipulate at least one processor to:

provide an actual amount of feed given for a prior time period;

assign the first weight factor based on a comparison of a first predicted feed amount provided by the first feeding appetite forecast model relative to the actual amount of feed given for the prior time period; and assign the second weight factor based on a comparison of a second predicted feed amount provided by the second feeding appetite forecast model relative to the actual amount of feed given for the prior time period.

11. The non-transitory computer readable medium of claim 9, further embodying executable instructions to manipulate at least one processor to:

provide a feed table amount of feed calculated to be given for a prior time period;

assign the first weight factor based on a comparison of a first predicted feed amount provided by the first feeding appetite forecast model relative to the feed table amount of feed calculated for the prior time period; and assign the second weight factor based on a comparison of a second predicted feed amount provided by the second feeding appetite forecast model relative to the feed table amount of feed calculated for the prior time period.

12. The non-transitory computer readable medium of claim 8, further embodying executable instructions to manipulate at least one processor to:

adaptively re-weight, based at least in part on a weather forecast for a future time period, the first feeding appetite forecast model relative to the second feeding appetite forecast model.

13. The non-transitory computer readable medium of claim 12, further embodying executable instructions to manipulate at least one processor to:

preferentially weight, based at least in part on a first environmental parameter of the weather forecast exceeding a predetermined threshold for the future time period, the first feeding appetite forecast model relative to the second feeding appetite forecast model.

14. The non-transitory computer readable medium of claim 12, further embodying executable instructions to manipulate at least one processor to:

preferentially weighting, based at least in part on a second environmental parameter of the weather forecast exceeding a predetermined threshold for the future time period, the second feeding appetite forecast model relative to the first feeding appetite forecast model.

15. A system, comprising:

a first set of one or more sensors configured to generate a first feeding parameter data set associated with a first feeding parameter;

a second set of one or more sensors configured to generate a second feeding parameter data set associated with a second feeding parameter;

a digital storage medium, encoding instructions executable by a computing device;

a processor, communicably coupled to the digital storage medium, configured to execute the instructions, wherein the instructions are configured to:

provide the first feeding parameter data set to a first feeding appetite forecast model;

provide the second feeding parameter data set to a second feeding appetite forecast model different from the first forecast model;

adaptively weight the first feeding appetite forecast model with a first weighting factor relative to a second weighting factor for the second feeding appetite forecast model;

determine an aggregated appetite score based on a combination of the first feeding appetite forecast model using the first weight factor and the second feeding appetite forecast model using the second weight factor; and provide a feeding instruction signal generated based at least in part on the aggregated appetite score for modifying operations of a feed control system.

16. The system of claim 15, wherein the processor is further configured to:

receive a measured reference data related to the first feeding parameter and the second feeding parameter;

assign the first weight factor to the first feeding appetite forecast model based on a comparison of the first forecast parameter data set with the measured reference data; and assign the second weight factor to the second feeding appetite forecast model based on a comparison of the second feeding parameter data set with the measured reference data.

17. The system of claim 15, wherein the processor is further configured to:

adaptively re-weight, based at least in part on a weather forecast for a future time period, the first feeding appetite forecast model relative to the second feeding appetite forecast model.

18. The system of claim 17, wherein the processor is further configured to:

preferentially weight, based at least in part on a first environmental parameter of the weather forecast exceeding a predetermined threshold for the future time period, the first feeding appetite forecast model relative to the second feeding appetite forecast model.

19. The system of claim 15, wherein the first set of one or more sensors includes one or more cameras configured to capture imagery of animals within an aquatic environment.

20. The system of claim 15, wherein the second set of one or more sensors includes one or more acoustic sensors configured to record acoustic data generated by animals within an aquatic environment.

* * * * *